United States Patent
Boulanger et al.

(10) Patent No.: US 11,580,324 B2
(45) Date of Patent: Feb. 14, 2023

(54) SYSTEMS AND METHODS FOR DETECTING ENVIRONMENTAL OCCLUSION IN A WEARABLE COMPUTING DEVICE DISPLAY

(71) Applicant: GOOGLE LLC, Mountain View, CA (US)

(72) Inventors: Mathieu Boulanger, Kitchener (CA); Daniel Perry, Waterloo (CA); Gabriel Reyes, Dexter, MI (US)

(73) Assignee: GOOGLE LLC, Mountain View, CA (US)

(*) Notice: Subject to any disclaimer, the term of this patent is extended or adjusted under 35 U.S.C. 154(b) by 169 days.

(21) Appl. No.: 16/900,099

(22) Filed: Jun. 12, 2020

(65) Prior Publication Data

US 2020/0394456 A1    Dec. 17, 2020

Related U.S. Application Data

(60) Provisional application No. 62/861,602, filed on Jun. 14, 2019.

(51) Int. Cl.
*A63F 13/00*    (2014.01)
*G06K 9/62*    (2022.01)
*G06F 3/01*    (2006.01)
*G06V 20/00*    (2022.01)

(52) U.S. Cl.
CPC ......... *G06K 9/6253* (2013.01); *G06F 3/013* (2013.01); *G06V 20/00* (2022.01)

(58) Field of Classification Search
CPC ...... G06K 9/6253; G06V 20/00; G06F 3/013; A63F 13/537; A63F 13/26; G06T 5/008; H04W 76/14; G02B 27/0101
USPC ............................................. 345/156; 463/31
See application file for complete search history.

(56) References Cited

U.S. PATENT DOCUMENTS

| | | | |
|---|---|---|---|
| 10,841,174 B1* | 11/2020 | Ely | H04W 76/14 |
| 2014/0333521 A1* | 11/2014 | Hwang | G06F 3/013 345/156 |
| 2014/0364212 A1* | 12/2014 | Osman | A63F 13/537 463/31 |
| 2018/0015362 A1* | 1/2018 | Terahata | A63F 13/26 |
| 2020/0151958 A1* | 5/2020 | Livneh | G06T 5/008 |

FOREIGN PATENT DOCUMENTS

WO    WO 2019/067780    *    4/2019    ......... G02B 27/0101

* cited by examiner

*Primary Examiner* — Abdul-Samad A Adediran

(57) ABSTRACT

Systems and methods for displaying a visual interface in a display of a head-mounted wearable device when the display may occlude objects in the user's physical environment while in use. An image detection device oriented generally in-line with the user's line of sight is used to capture at least one image. One or more objects are detected in the at least one image and, based on the detection of the one or more objects, an environmental interaction mode may be activated or deactivated. In the environmental interaction mode, the user interface may be modified or disabled to facilitate viewing of the physical environment.

16 Claims, 31 Drawing Sheets

SYSTEMS AND METHODS FOR DETECTING ENVIRONMENTAL OCCLUSION IN A WEARABLE COMPUTING DEVICE DISPLAY

CROSS-REFERENCE TO RELATED APPLICATIONS

This application claims the benefit of U.S. Provisional Application No. 62/861,602, filed 14 Jun. 2019, titled "Systems and Methods for Detecting Environmental Occlusion in a Wearable Computing Device Display", the content of which is incorporated herein by reference in its entirety.

FIELD

The described embodiments relate to computing devices and, in particular, to head-worn computing devices.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and e-book readers are all examples of portable electronic devices. However, the convenience of being able to carry a portable electronic device has also introduced the inconvenience of encumbering the user's hands with the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, visible to others, and generally present for long periods of time, form factor (i.e., size, geometry, and appearance) is a major design consideration in wearable electronic devices.

SUMMARY

A method of displaying a visual interface in a display of a wearable device may be summarized as including: displaying a user interface element in the display, the display generally oriented in a first direction facing the user while the wearable device is in use; capturing at least one image using an image detection device of the wearable device, the image detection device generally oriented in at least a second direction opposite the first direction; detecting, in the at least one image, one or more objects; determining, based on the detection of the one or more objects, that an environmental interaction mode is to be activated; and activating the environmental interaction mode.

In some cases, activating the environmental interaction mode comprises one or more of reducing a brightness of the user interface element, reducing a display brightness, increasing an opacity of the user interface element, increasing a display opacity, temporarily removing the user interface element from the display, repositioning the user interface element in the display, and/or disabling the display.

In some cases, the method may further include: capturing at least one additional image using the image detection device; detecting that the one or more objects are no longer present in the at least one additional image; and de-activating the environmental interaction mode.

In some cases, de-activating the environmental interaction mode comprises one or more of increasing a brightness of the user interface element, increasing a display brightness, decreasing an opacity of the user interface element, decreasing a display opacity, restoring the user interface element to the display, repositioning the user interface element in the display, and/or re-enabling the display.

In some cases, determining that the environmental interaction mode is to be activated further comprises: detecting that the one or more objects are within a line of sight of the user; and determining that the user interface element at least partially occludes the one or more objects within the line of sight.

In some cases, detecting the line of sight comprises tracking an eye, or eyes, of the user using a gaze detection device generally oriented in the first direction.

In some cases, determining that the user interface element at least partially occludes the one or more objects within the line of sight further comprises determining a focal length of the eye of the user; and determining that a focus distance of the eye of the user is longer than a focal length of the display from the eye of the user.

In some cases, detecting the one or more objects comprises: a processor of the wearable device performing object recognition processing the at least one image.

In some cases, detecting the one or more objects comprises: transmitting the at least one image to a computing device; and receiving, from the computing device, an indication of the one or more objects within the image.

A method of displaying a visual interface in a display of a wearable device may be summarized as including: displaying a user interface element in the display, the display generally oriented in a first direction facing the user while the wearable device is in use; detecting at least one sensor input; processing the at least one sensor input to identify a stimulus; in response to detecting the stimulus, determining that an environmental interaction mode is to be activated; and activating the environmental interaction mode.

In some cases, at least one sensor input is an audio sensor, and the processing comprises detecting an audio stimulus.

In some cases, at least one sensor input is an inertial motion sensor, and the processing comprises detecting an inertial stimulus.

In some cases, at least one sensor input is a radio signal sensor, and the processing comprises detecting a radio signal strength.

In some cases, at least one sensor input is a data signal sensor, and processing comprises detecting a data signal.

In some cases, the wearable device is a head-mounted device. In some cases, the display is a projection display. In some cases, the display is a retinal projection display.

A wearable computing device may be summarized as including: a memory; a display device, the display generally oriented in a first direction facing the user while the wearable device is in use; an image detection device, the image detection device generally oriented in at least a second direction opposite the first direction; and a processor operatively coupled to the memory and the physical devices, the processor configured to: display a user interface element in the display device; capture at least one image using the image detection device; detect, in the at least one image, one or more objects; determine, based on the detection of the one or more objects, that an environmental interaction mode is to be activated; and activate the environmental interaction.

A non-transitory computer readable medium may be summarized as storing computer-executable instructions which, when executed by a computer processor, cause the computer processor to carry out the methods described herein.

BRIEF DESCRIPTION OF THE DRAWINGS

Embodiments of the present invention will now be described in detail with reference to the drawings, in which.

DESCRIPTION OF EXEMPLARY EMBODIMENTS

Figure 1:
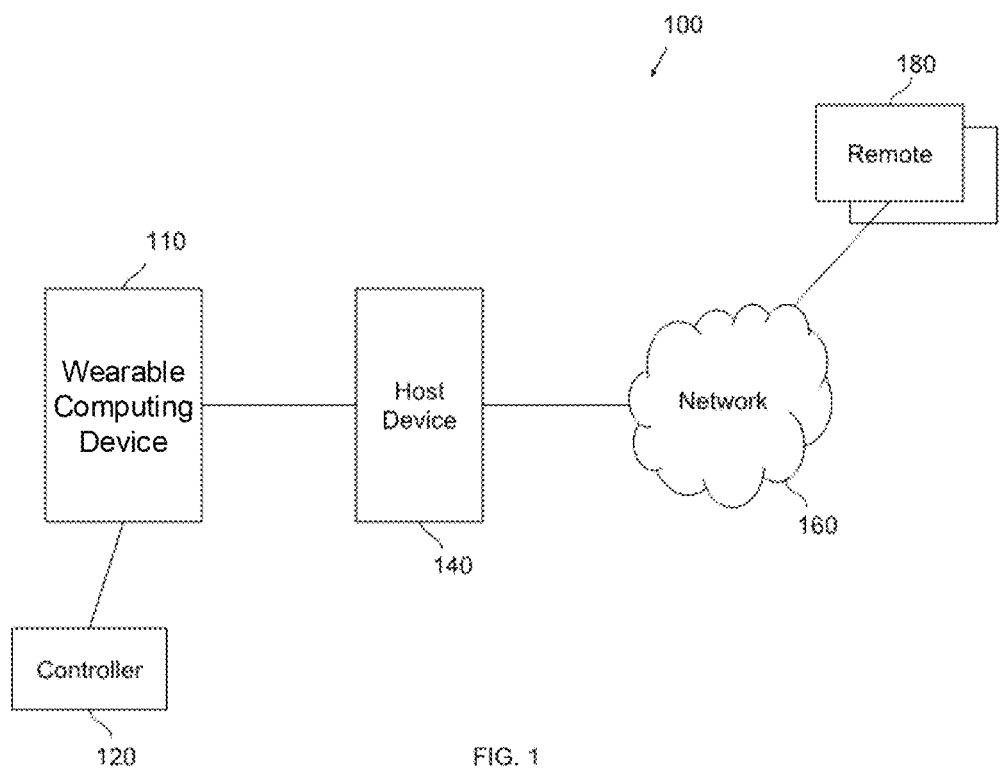
FIG. 1 is a schematic block diagram of a delegated network access system for a wearable computing device in accordance with at least some embodiments.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details, or with other methods, components, materials, etc. In other instances, well-known methods, procedures and components have not been described in detail have not been shown or described in detail to avoid unnecessarily obscuring descriptions of the embodiments, and since these are known to those skilled in the art. Furthermore, it should be noted that this description is not intended to limit the scope of the embodiments described herein, but rather as merely describing one or more exemplary implementations.

Unless the context requires otherwise, throughout the specification and claims which follow, the word "comprise" and variations thereof, such as, "comprises" and "comprising" are to be construed in an open, inclusive sense, that is as "including, but not limited to."

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Reference throughout this specification to "one implementation" or "an implementation" or "one embodiment" or "an embodiment" means that a particular feature, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations or embodiments.

The terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example implementations or embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g., a keyboard, mouse, touchscreen, or the like), and at least one output device (e.g., a display screen, a printer, a wireless radio, or the like) depending on the nature of the device.

It should also be noted that there may be some elements that are used to implement at least part of one of the implementations or embodiments described herein that may be implemented via software that is written in a high-level computer programming language such as one that employs an object-oriented paradigm. Accordingly, the program code may be written in Java, C++ or any other suitable programming language and may comprise modules or classes, as is known to those skilled in object-oriented programming.

Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory (ROM), electrically erasable programmable read-only memory (EEPROM), magnetic disk, optical disc) or a device that is readable by a general or special purpose programmable device. The software program code, when read by the programmable device, configures the programmable device to operate in a new, specific and predefined manner in order to perform at least one of the methods described herein.

The description sets forth various embodiments of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM), EEPROM, flash memory, a portable compact disc read-only memory (CDROM), digital tape, and other non-transitory media.

Referring now to FIG. 1, there is illustrated a schematic block diagram of a delegated network access system for a wearable computing device in accordance with at least some embodiments.

In the example of FIG. 1, delegated network access system 100 has a wearable computing device 110, a controller device 120, a host device 140, and one or more remote computing devices 180, connected to the host device 140 via a network 160.

Host device 140 and remote computing devices 180 are each computing devices generally equipped for data communication via network 160. Network 160 may be a public network, such as the Internet, a private network, or some combination thereof. In some cases, network 160 may be a direct communications link. The data communication network can be constructed using various networking technologies and topologies. For example, portions of the network may be mobile data networks. Although not explicitly described in each case, communications between the various elements of system 100 generally involve session-level security, such as Transport Layer Security (TLS).

Wearable computing device 110 may be a computing device as described further herein and, in particular, wearable computing device 110 may be equipped with a wireless personal area network (PAN) interface. Examples of a wireless PAN may include, but are not limited to, interfaces that implement the Bluetooth™ standard (e.g., Bluetooth™ 4.2, or earlier, or more recent versions to the extent that such versions are functionally consistent with existing versions) or Bluetooth™ Low Energy (BLE) standard.

Wearable computing device 110 communicates with host device 140 and controller device 110 via one or more wireless PAN. Generally, wearable computing device 110 may use Bluetooth™ for communication with host device 140 and BLE for communication with controller device 120, given the latter's lower energy and data usage.

Controller device 120 is another computing device that may be used as an input device for wearable computing device 110, as described further herein.

In at least some embodiments, wearable computing device 110 may communicate with remote computing devices 180 via host device 140 and network 160. Generally, host device 140 may act as a communication gateway to network 160 and remote computing devices 180 on behalf of wearable computing device 110. That is, host device 140 may receive data from wearable computing device 110 over a wireless PAN and forward the received data to remote computing devices 180 over an Internet-connected interface, and vice versa. In some other embodiments, where wearable computing device 110 is equipped with appropriate data communications interfaces, wearable computing device 110 may communicate directly with remote computing devices 180 via network 160.

Host device 140 is a computing device, such as a mobile phone, smartphone or tablet. In at least some embodiments, host device 140 is a wireless mobile device. In addition to a wireless PAN interface such as Bluetooth™ or BLE, or both, host device 140 is generally equipped with a mobile wireless data communications interface, such as Global System for Mobile Communications (GSM), Enhanced Data Rates for GSM Evolution (EDGE), Universal Mobile Telecommunications System (UMTS), Long Term evolution (LTE), 5G systems and the like. In some embodiments, host device 140 may be equipped with a wireless data communications interface capable of communication in one or more of the IEEE 802.11 family of protocols (e.g., "Wi-Fi"). In still other embodiments, host device 140 may be equipped with a fixed data communications interface capable of communication in, e.g., the IEEE 802.3 family of protocols (e.g., "Ethernet").

Each of remote computing devices 180 is a computer, such as a computer server. Remote computing devices 180 may provide, for example, a network-based service. For example, one or more remote computing devices 180 may provide communication services such as e-mail, instant messaging or voice or video telephony, a navigation service, a data storage service, an authentication service, a weather service, a calendar service, a software update service, a search service, and so on.

Although illustrated as a single group of devices, each remote computing device 180 may be constructed from multiple devices, as in a server farm, which may be in geographically diverse locations, and accessed via a load balancer. Such arrangements are sometimes referred to as a "cloud" service. For example, network remote computing device 180 may be constructed of multiple edge node servers, which replicate and serve data in geographically diverse locations. The functionality described herein as provided by a particular server (e.g., remote computing device 180) may be divided among multiple physical devices, which are then logically linked or merged from the third-party perspective. In some cases, one or more server may be a virtual machine, which operates in a host environment using virtualized hardware.

Figure 2:
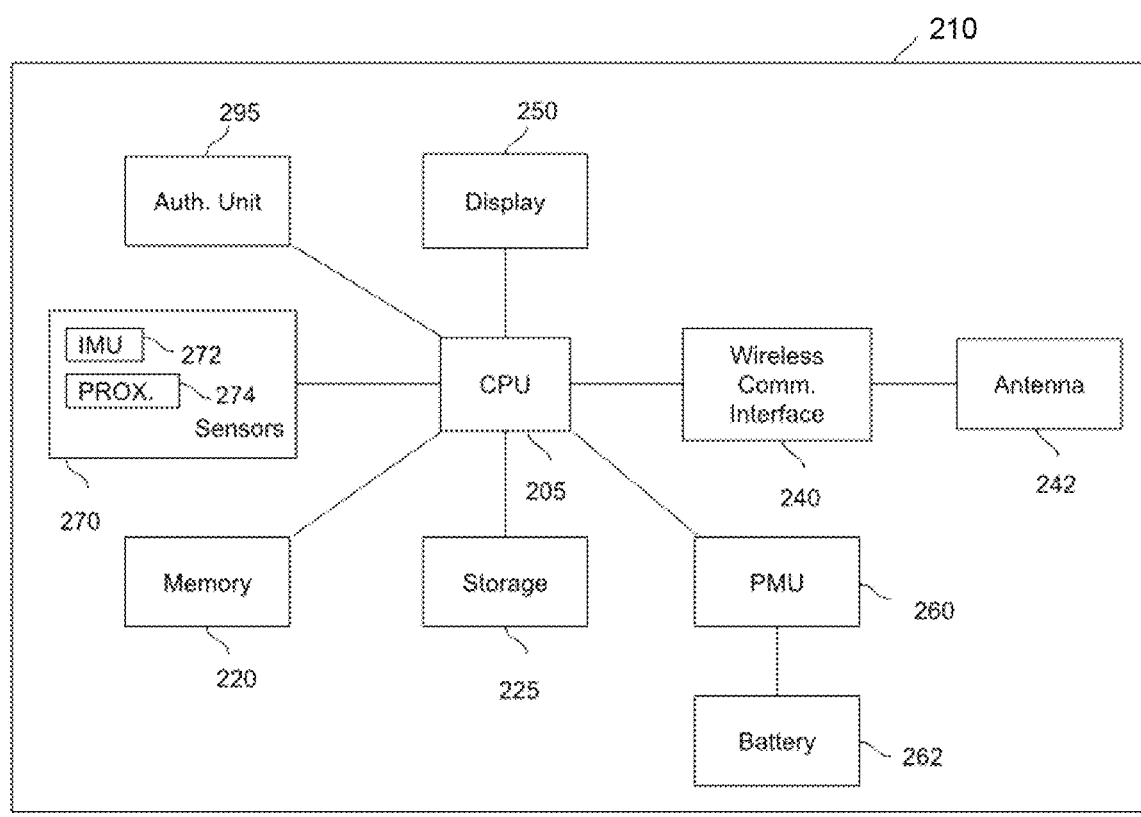
FIG. 2 is a simplified block diagram of a wearable computing device of the system of FIG. 1.

Referring now to FIG. 2, there is illustrated a simplified block diagram of wearable computing device 210. Wearable computing device 210 is one example implementation of a wearable computing device 110 as described with reference to FIG. 1.

Wearable computing device 210 has a processor 205, which is communicatively coupled to a volatile memory 220, a non-volatile memory 225, a wireless data communications interface 240, an antenna 242, an output device 250, a power management unit (PMU) 260, a battery 262, one or more sensors 270 (e.g., inertial motion unit (IMU) 272, proximity sensor 274) and, optionally, an authentication unit 295.

In at least some embodiments, wearable computing device 210 is a computing device such as a head-mounted eyeglasses device.

In some embodiments, wearable computing device 210 may have a peripheral bus interface (not shown) which is used to communicatively couple the processor 205 with other elements of wearable computing device 210. It will be appreciated that FIG. 2 is a simplified diagram of but one example embodiment, and that various other arrangements and computer system architectures may be used.

Processor 205 is a computer processor, such as a general purpose microprocessor or microcontroller. In some other cases, processor 205 may be a field programmable gate array, application specific integrated circuit, microcontroller, or other suitable computer processor.

Processor 205 is coupled, via a computer data bus (not shown), to volatile memory 220 and non-volatile memory 225. Non-volatile memory 225 stores computer programs (e.g., application programs, service programs, drivers, frameworks, etc.) consisting of computer-executable instructions, which may be loaded into volatile memory 220 for execution by processor 205 as needed. It will be understood by those skilled in the art that references herein to a computing device as carrying out a function or acting in a particular way imply that a processor (e.g., processor 205 of wearable computing device 210) is executing instructions (e.g., a software program) stored in a memory and possibly transmitting or receiving inputs and outputs via one or more interface. Volatile memory 220 may also store data input to, or output from, processor 205 in the course of executing the computer-executable instructions.

Processor 205 is also coupled to an output device 250, which outputs information and data as directed by various computer programs executed by wearable computing device 210. For example, output device 250 may be a light emitting diode (LED) or liquid crystal display (LCD) display, a projection device, or a laser-based retinal projection device.

Processor 205 is coupled to wireless data communication interface 240. In at least some embodiments, the wireless data communication interface 240 is a wireless PAN interface, such as a Bluetooth™ interface (e.g., Bluetooth™ 4.2, or earlier, or more recent versions to the extent that such versions are functionally consistent with existing versions) or Bluetooth™ Low Energy (BLE) interface. In some other embodiments, wireless data communication interface 240 may be another wireless interface, such as Wi-Fi™ or a cellular data network interface.

Wireless data communication interface 240 is coupled to a wireless antenna 242, which is used to transmit and receive signals for wireless data communication.

In implementations or embodiments where wearable computing device 210 is a wearable or portable wearable computing device, wearable computing device 210 may be powered by an energy storage unit 262, such as a battery or capacitor. The energy storage unit 262 may be managed (e.g., charged and discharged) under the control of a power management unit (PMU) 260. Power management unit 260 may also be coupled to processor 205, and other elements of wearable computing device 210, to regulate energy usage of those elements. For example, PMU 260 may direct processor 205 to operate at a reduced frequency, or to disable subcomponents, in order to reduce energy usage when the energy or charge level of energy storage unit 262 is low.

Wearable computing device 210 may be equipped with one or more sensors 270, such as an inertial motion unit (IMU) 272, a proximity sensor 274, and other sensors (not shown).

IMU 272 may be an accelerometer-based device, for example, that can detect acceleration—and therefore, orientation—of wearable computing device 210 in 3-dimensional space. Proximity sensor 274 may be used, for example, to determine when wearable computing device 210 is in close proximity to some object, such as a user's head, for example.

Authentication unit 295 may be used in some circumstances to support processor 205 when communicating with external devices that call for an embedded element or chip for authentication. In such cases, processor 205 may communicate with authentication unit 295 to obtain the desired authentication data.

In some embodiments, processor 205 may be coupled to a peripheral bus interface via a data bus. In other embodiments, a peripheral bus interface may be omitted and processor 205 may be coupled to other elements of wearable computing device 210 via a direct link.

Figure 3:
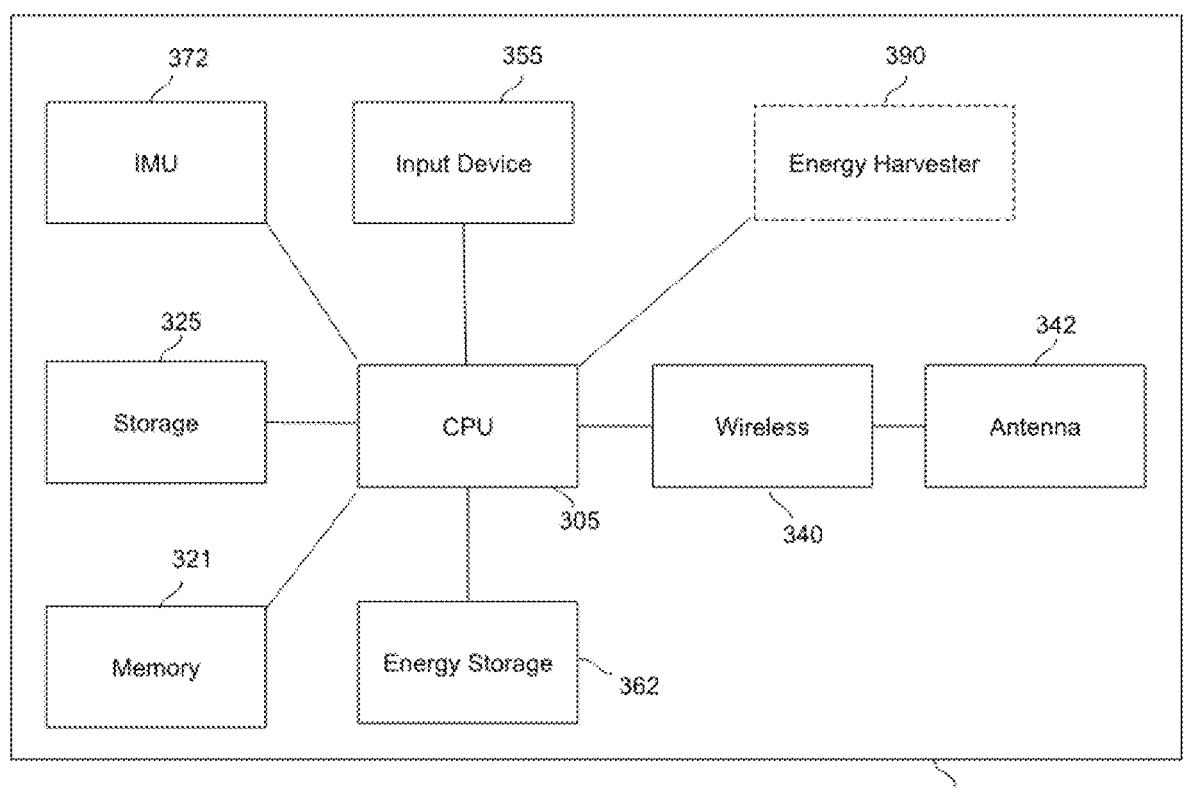
FIG. 3 is a simplified block diagram of a controller device of the system of FIG. 1.

Referring now to FIG. 3, there is illustrated a simplified block diagram of controller device 320. Controller device 320 is one example implementation of a controller device 120 as described with reference to FIG. 1.

Controller device 320 has a processor 305, which is communicatively coupled to a volatile memory 321, a non-volatile memory 325, a wireless data communications interface 340, an antenna 342, an input device 355, an energy storage unit 362, an IMU 372 and, optionally, an energy harvester 390.

Figure 10A:
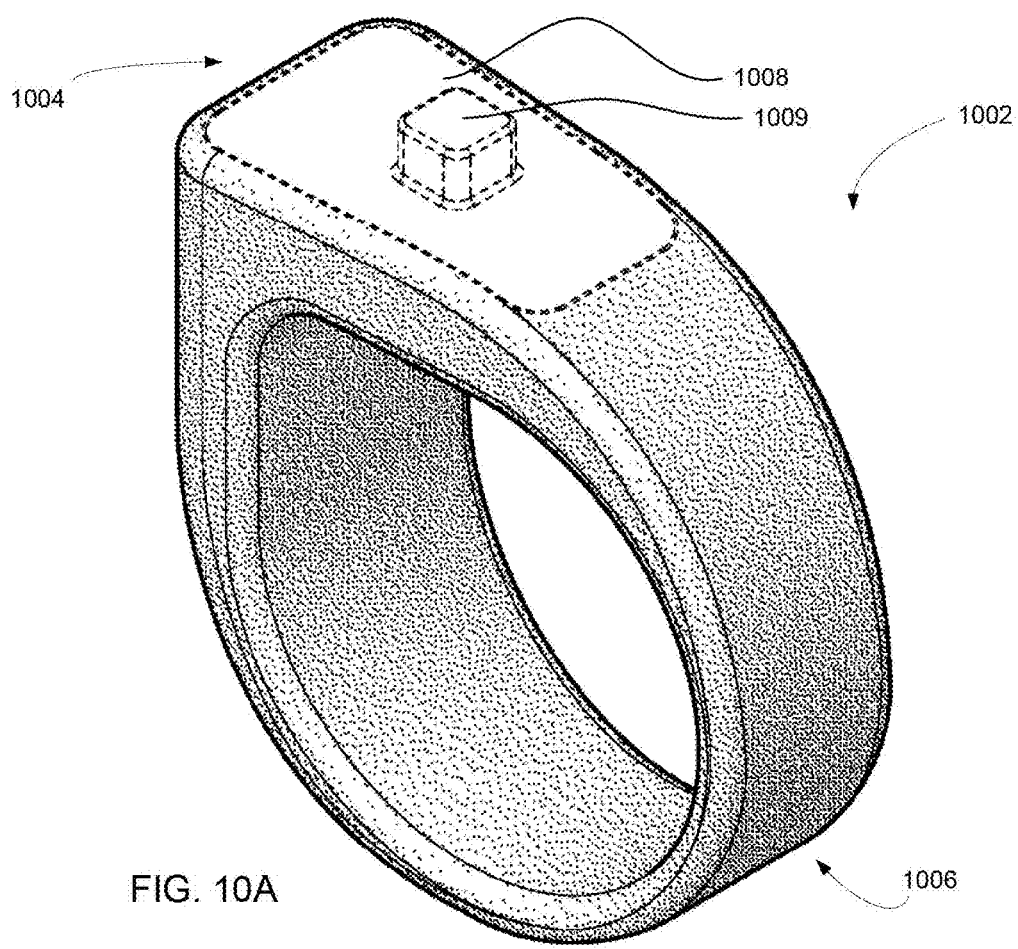
FIGS. 10A and 10B are perspective views of a controller device in accordance with some embodiments.
Figure 10B:
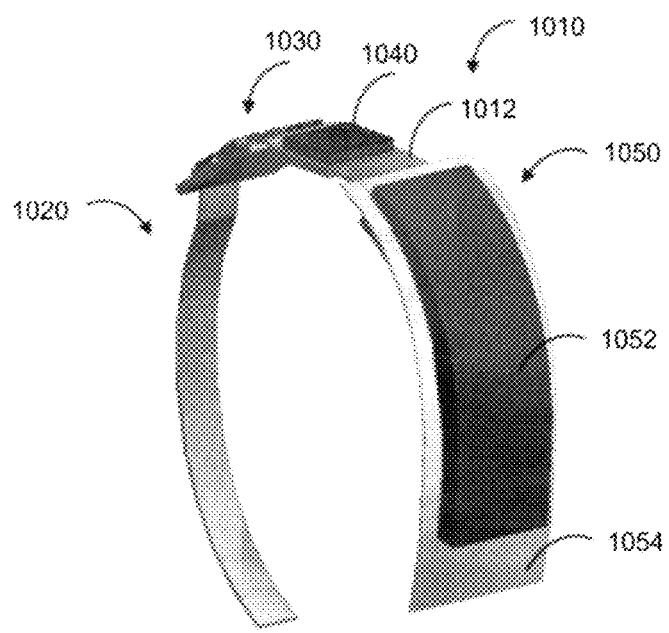
Figure 10C:
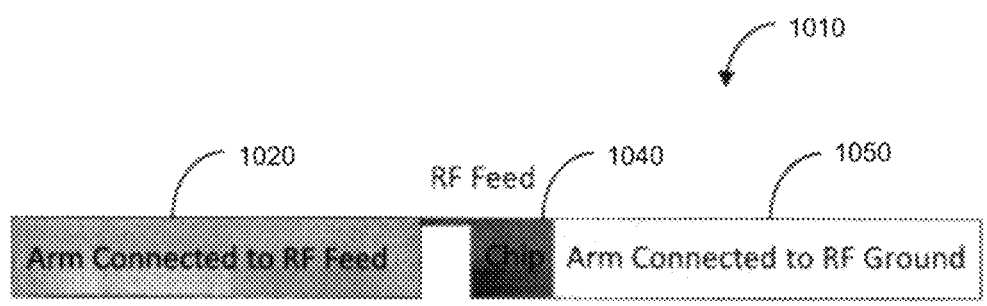
FIG. 10C is a block diagram of an electronic circuit housed within the controller device of FIGS. 10A and 10B.

In at least some embodiments, controller device 320 is a wearable device, such as a ring device as described herein with respect to FIGS. 10A to 10C.

In some implementations or embodiments, controller device 320 may be an integrated system in a single chip or package. It will be appreciated that FIG. 3 is a simplified diagram of but one example embodiment, and that various other arrangements and computer system architectures may be used.

Processor 305 is a computer processor, such as a microcontroller or general purpose microprocessor. In some other cases, processor 305 may be a field programmable gate array, application specific integrated circuit, or other suitable computer processor.

Processor 305 is coupled to volatile memory 321 and non-volatile memory 325, such as an EEPROM element. Non-volatile memory 325 stores at least one computer program (e.g., firmware) consisting of computer-executable instructions, which may be loaded into volatile memory 321 for execution by processor 305 as needed. It will be understood by those skilled in the art that references herein to a controller device as carrying out a function or acting in a particular way imply that a processor (e.g., processor 305 of controller device 320) is executing instructions (e.g., a software program) stored in a memory and possibly transmitting or receiving inputs and outputs via one or more interface. Volatile memory 321 may also store data input to, or output from, processor 305 in the course of executing the computer-executable instructions.

Processor 305 is also coupled to an input device 355, which generates and transmits signals representative of user inputs to various computer programs executed by controller device 320. For example, input device 355 may be a button, a touch pad, some other suitable input, or some combination of input devices.

Processor 305 is coupled to wireless data communication interface 340. In at least some embodiments, the wireless data communication interface 340 is a low energy wireless PAN interface, such as a Bluetooth™ Low Energy (BLE) interface. In some other embodiments, wireless data communication interface 340 may be another wireless interface, such as standard Bluetooth™, Wi-Fi™ or a cellular data network interface.

Wireless data communication interface 340 is coupled to a wireless antenna 342, which is used to transmit and receive signals for wireless data communication.

Controller device 320 may be powered by an energy storage unit 362, such as a battery or capacitor. In some embodiments, the energy storage unit 362 may be charged by an energy harvester 390. For example, energy harvester 390 may convert mechanical motion of controller device 320 into electrical charge that can be stored in energy storage unit 362, or may convert solar energy into electrical charge that can be stored in energy storage unit 362.

Controller device 320 may be equipped with one or more sensors, such as an inertial motion unit (IMU) 372. IMU 372 may be an accelerometer-based device, for example, that can detect acceleration—and therefore, orientation—of controller device 320 in 3-dimensional space.

Figure 4:
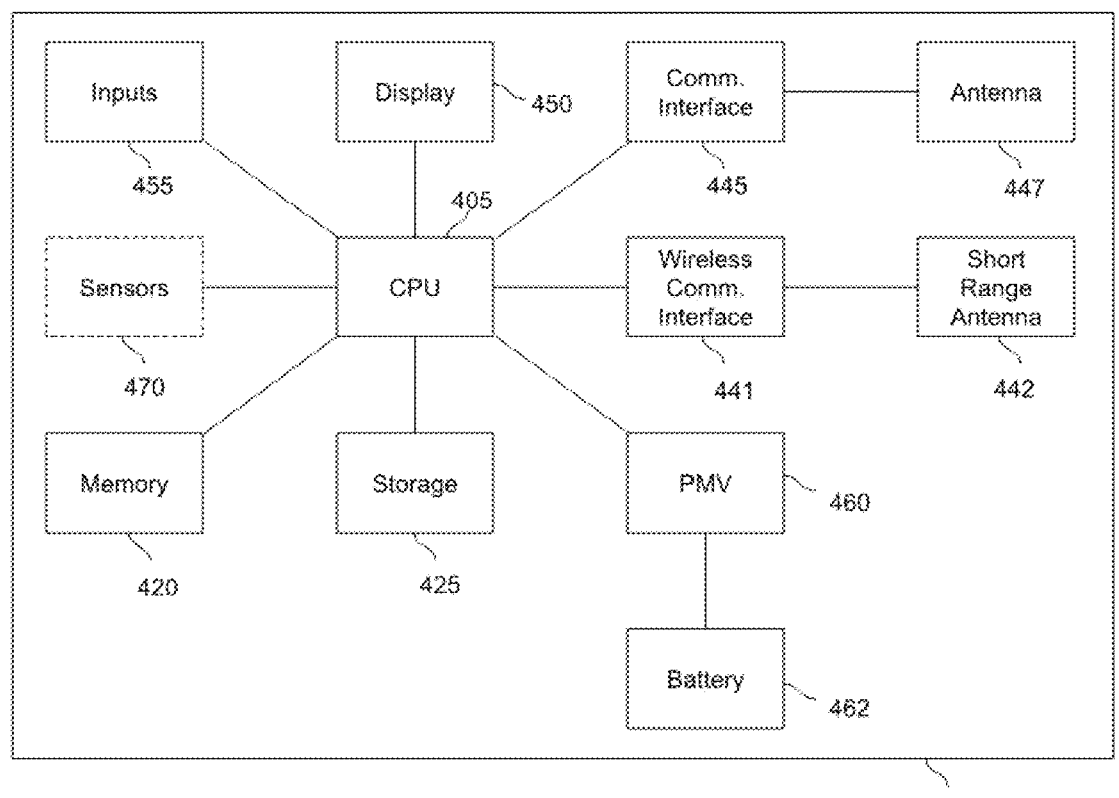
FIG. 4 is a simplified block diagram of a host computing device of the system of FIG. 1.

Referring now to FIG. 4, there is illustrated a simplified block diagram of host computing device 440. Host computing device 440 is one example implementation of a host computing device 140 as described with reference to FIG. 1.

Host computing device 440 has a processor 405, which is communicatively coupled to a volatile memory 420, a non-volatile memory 425, one or more input devices 455, one or more output devices 450, a power management unit (PMU) 460, a battery 462, one or more sensors 470, a short-range wireless data communications interface 441, a short-range antenna 442, a data communications interface 445 and an antenna 447.

In at least some embodiments, host computing device 440 is a mobile computing device, such as a smart phone or tablet device. In some embodiments, host computing device 440 may also be a wearable device. In some embodiments, host computing device 440 may be a non-portable computing device, such as a personal computer, a computer server, a wireless base station or router, or the like.

In some embodiments, host computing device 440 may have a peripheral bus interface (not shown) which is used to communicatively couple the processor 405 with other elements of host computing device 440. It will be appreciated that FIG. 4 is a simplified diagram of but one example embodiment, and that various other arrangements and computer system architectures may be used.

Processor 405 is a computer processor, such as a general purpose microprocessor or microcontroller. In some other cases, processor 405 may be a field programmable gate array, application specific integrated circuit, microcontroller, or other suitable computer processor.

Processor 405 is coupled, via a computer data bus (not shown), to volatile memory 420 and non-volatile memory 425. Non-volatile memory 425 stores computer programs (e.g., application programs, service programs, drivers, frameworks, etc.) consisting of computer-executable instructions, which may be loaded into volatile memory 420 for execution by processor 405 as needed. It will be understood by those skilled in the art that references herein to a computing device as carrying out a function or acting in a particular way imply that a processor (e.g., processor 405 of computing device 440) is executing instructions (e.g., a software program) stored in a memory and possibly transmitting or receiving inputs and outputs via one or more interface. Volatile memory 420 may also store data input to, or output from, processor 405 in the course of executing the computer-executable instructions.

Processor 405 is also coupled to one or more output device 450, which outputs information and data as directed by various computer programs executed by host computing device 440. For example, output device 450 may be a light emitting diode (LED) or liquid crystal display (LCD) display, an audio speaker, a vibration motor, etc.

Processor 405 is coupled to a short-range wireless data communication interface 441. In at least some embodiments, the short-range wireless data communication interface 441 is a wireless PAN interface, such as a Bluetooth™ interface (e.g., Bluetooth™ 4.2, or earlier, or more recent versions to the extent that such versions are functionally consistent with existing versions) or Bluetooth™ Low Energy (BLE) interface. In some other embodiments, short-range wireless data communication interface 441 may be another wireless interface, such as Wi-Fi™ or a cellular data network interface.

Short-range wireless data communication interface 441 is coupled to a wireless antenna 442, which is used to transmit and receive signals for short-range wireless data communication.

Processor 405 may also be coupled to a data communication interface 445. In at least some embodiments, the data communication interface 445 is a wireless cellular data network interface, such as GSM, EDGE, UMTS, LTE, 5G systems and the like. In some other embodiments, data communication interface 441 may be another wireless interface, such as Wi-Fi™. In some embodiments, data communication interface 441 may be a fixed data communication interface, such as an IEEE 802.3 interface (e.g., Ethernet).

In embodiments where data communication interface 445 is a wireless communication interface, it may be coupled to an antenna 447, which can be used to transmit and receive signals for wireless data communication.

In implementations or embodiments where host computing device 440 is a portable computing device, host computing device 440 may be powered by an energy storage unit 462, such as a battery or capacitor. The energy storage unit 462 may be managed (e.g., charged and discharged) under the control of a PMU 460. PMU 460 may also be coupled to processor 405, and other elements of host computing device 440, to regulate energy usage of those elements. For example, PMU 440 may direct processor 405 to operate at a reduced frequency, or to disable subcomponents, in order to reduce energy usage when the energy or charge level of energy storage unit 462 is low.

Host computing device 440 may be equipped with one or more sensors 470, such as an IMU, a proximity sensor, or both.

In some implementations or embodiments, processor 405 may be coupled to a peripheral bus interface via a data bus. In other embodiments, a peripheral bus interface may be omitted and processor 405 may be coupled to other elements of host computing device 440 via a direct link.

Figure 5:
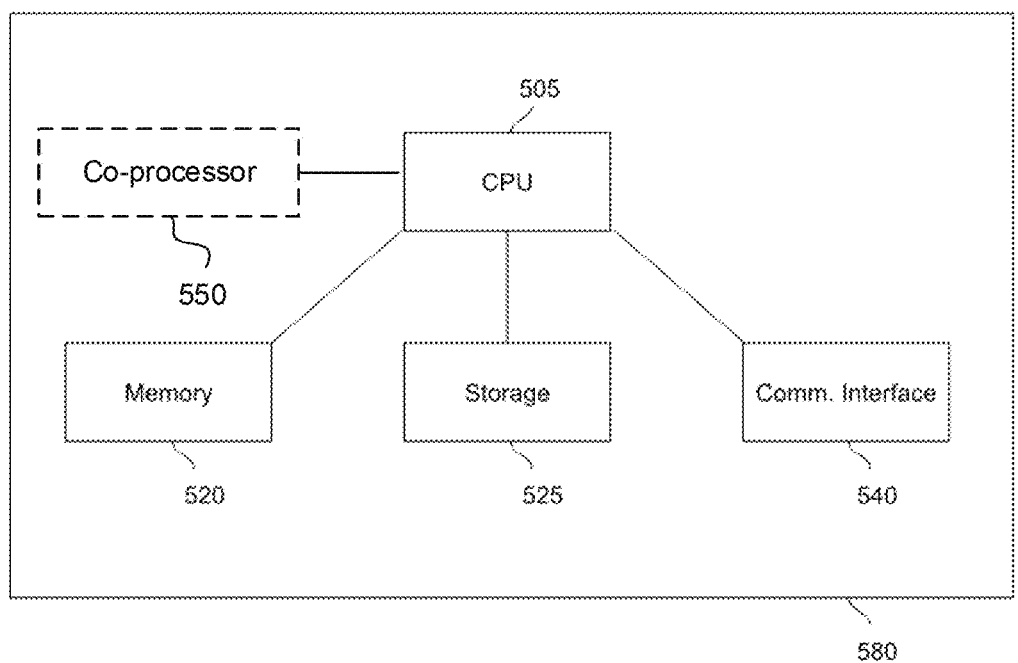
FIG. 5 is a simplified block diagram of a remote computing device of the system of FIG. 1.

Referring now to FIG. 5, there is illustrated a simplified block diagram of remote computing device 580. Remote computing device 580 is one example implementation of a remote computing device 180 as described with reference to FIG. 1.

Remote computing device 580 has a processor 505, which is communicatively coupled to a volatile memory 520, a non-volatile memory 525, and a data communications interface 540.

In some implementations or embodiments, remote computing device 580 may also have a co-processor 550. Co-processor 550 may be one or more microprocessor, ASIC, field programmable gate array (FPGA) and/or graphics processing unit (GPU), which may contain specialized processing hardware to perform certain tasks that may otherwise be performed by processor 505. For example, in some cases, co-processor 550 may be a GPU that is configured to perform stream processing for certain computing tasks with a high degree of compute intensity, parallelism and/or data locality.

In at least some implementations or embodiments, remote computing device 580 is a computer server, which may be provided in a data center, or as part of a cloud computing environment.

In some implementations or embodiments, remote computing device 580 may have a peripheral bus interface (not shown) which is used to communicatively couple the processor 505 with other elements of remote computing device 580. It will be appreciated that FIG. 5 is a simplified diagram of but one example embodiment, and that various other arrangements and computer system architectures may be used. Description of other elements of the remote computing device 580 are omitted to aid exposition.

Processor 505 is a computer processor, such as a general purpose microprocessor. In some other cases, processor 505 may be a field programmable gate array, application specific integrated circuit, microcontroller, or other suitable computer processor.

Processor 505 is coupled, via a computer data bus (not shown), to volatile memory 520 and non-volatile memory 525. Non-volatile memory 525 stores computer programs (e.g., application programs, service programs, drivers, frameworks, etc.) consisting of computer-executable instructions, which may be loaded into volatile memory 520 for execution by processor 505 as needed. It will be understood by those skilled in the art that references herein to a computing device as carrying out a function or acting in a particular way imply that a processor (e.g., processor 505 of computing device 580) is executing instructions (e.g., a software program) stored in a memory and possibly transmitting or receiving inputs and outputs via one or more interface. Volatile memory 520 may also store data input to, or output from, processor 505 in the course of executing the computer-executable instructions.

Processor 505 is coupled to a data communication interface 540. In at least some embodiments, the data communication interface 540 is an IEEE 802.3 interface (e.g., Ethernet) or other data communication interface.

In some embodiments, processor 505 may be coupled to a peripheral bus interface via a data bus. In other embodiments, a peripheral bus interface may be omitted and processor 505 may be coupled to other elements of remote computing device 580 via a direct link.

Figure 6A:
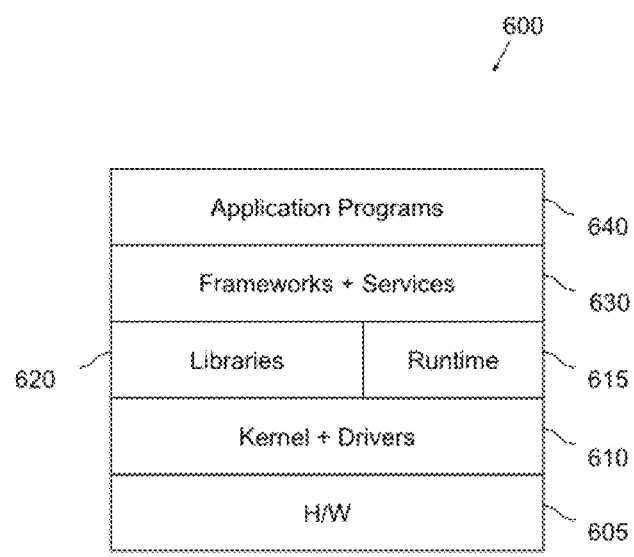
FIG. 6A is a schematic block diagram of an example platform architecture implemented by a wearable computing device in accordance with some embodiments.

Referring now to FIG. 6A, there is illustrated a schematic block diagram of an example platform architecture implemented by a wearable computing device, such as wearable computing device 110 of FIG. 1 and wearable computing device 210 of FIG. 2. Platform architecture 600 is represented by a "stack" in which successive layers represent increasing levels of abstraction from a bottom physical device layer.

Platform architecture 600 has a physical or hardware device layer 605, which represents the various physical resources of the wearable computing device, such as a processor, communication interfaces, storage devices, etc. For example, the physical resources of wearable computing device 210 described in FIG. 2 may form the hardware layer 605 of the platform in some embodiments.

Platform architecture 600 further has a low-level layer 610, which represents the operating system kernel and device driver software. The kernel represents a lowest-level of abstraction and performs various functions, such as resource management, memory management, device management, and handling of system calls for other programs. For example, the kernel may be responsible for mediating accessing to the wearable computing device's physical resources found in the hardware layer 605. In some embodiments, the kernel may be a Linux kernel, and the device drivers may be provided for the processor, communication interfaces, storage devices, PMU, etc. Device drivers may be integrated into the kernel (e.g., in a "monolithic" kernel), or may be loadable modules that can be dynamically loaded or unloaded by the kernel as desired.

In at least some implementations or embodiments, platform 600 has a hardware abstraction layer (HAL) 613. Hardware abstraction layer 613 generally presents a device-independent interface corresponding to each physical device of the hardware layer 605, making the device-independent interface available to higher-level elements of the platform in a generally consistent manner, and using the management and mediation of the kernel and drivers of low-level layer 610. In this way, the HAL 613 connects the physical devices to the higher-level frameworks that may use the physical device (e.g., an audio device can be connected to an audio framework).

In implementations or embodiments based on the Android operating system, the HAL 613 may also be referred to as the "vendor interface" which abstracts low-level code. The Android operating system may also provide a driver that facilitates and enables inter-process communication (IPC) between processes, including between frameworks and the HAL. This IPC driver may be referred to as "binder". The binder driver manages traffic between processes by using binder contexts. Each binder context has a device node and a corresponding context manager. Each context manager can be accessed only through the corresponding device node.

In the Android operating system, the default IPC binder architecture incurs delays as data being relayed between processes may be copied in memory several times by binder.

Figure 13:
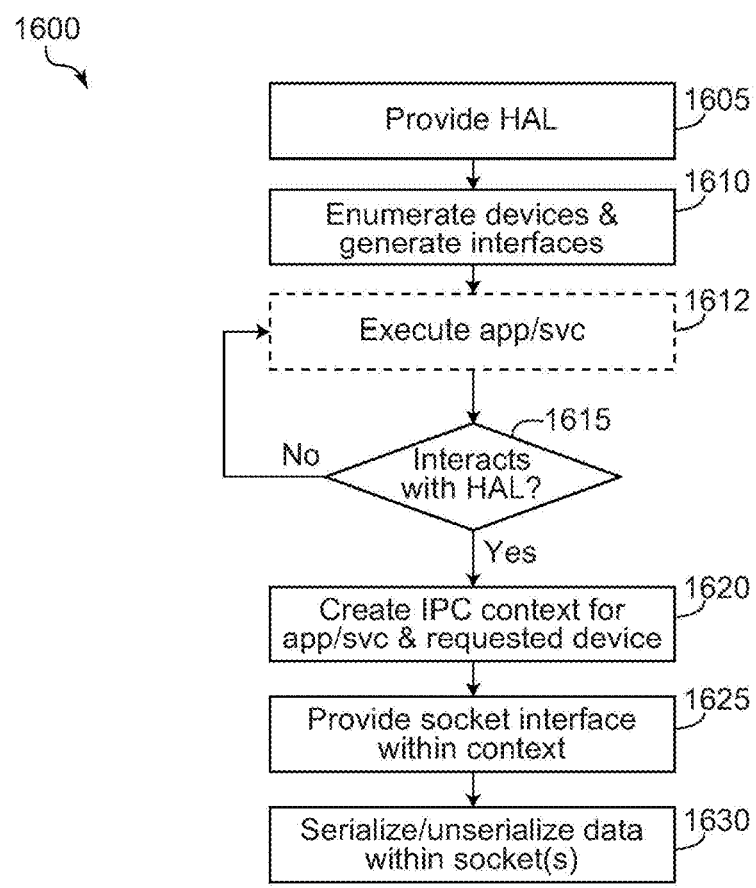
FIG. 13 is an example process flow for providing a hardware abstraction layer with reduced latency in accordance with some embodiments.

Referring now to FIG. 13, there is illustrated an example process flow for providing a hardware abstraction layer with reduced latency in accordance with at least some implementations or embodiments.

Method 1600 begins at 1605, with a processor, such as the processor of a wearable computing device, providing a HAL.

At 1610, the processor enumerates physical devices, such as audio devices, video devices, network devices, etc. and generates respective interfaces for each physical device.

At 1612, the processor executes one or more application programs or systems services. One or more of the programs or services may attempt to access a physical device by initiating a connection to a HAL interface using, e.g., an interface API call. At 1615, these connection attempts can be detected.

In response to a connection attempt, the processor creates an inter-process communication context specific to the requesting application or service, and the requested HAL interface (which corresponds to a physical device).

Next, at 1625, the processor provides a socket interface within the created IPC context. The socket interface may be, or may emulate, TCP sockets or UNIX domain sockets. The application or service may thereafter communicate with the physical device, via the HAL interface, using a socket-based communication scheme.

To simplify communication and to reduce overhead, communication with the device may be serialized at 1630, for example by using a protocol buffer.

By using this approach of unique IPC contexts for each program-device pair, and by using socket-based, serialized communication, overall latency can be reduced.

Referring once again to FIG. 6A, platform architecture 600 has a further library layer. Libraries 620 represent system libraries that can be used to carry out core functions of an operating system. Libraries 620 are collections of software functions that can be called by various application programs, frameworks and services. In some cases, libraries 620 may be shared libraries that can be called by a wide variety of different software. For example, shared libraries may include functions for process creation and control, networking, file manipulation, and other routine functions.

In some implementations or embodiments, platform architecture 600 may have a run-time environment 615. Run-time environment 615 may employ just-in-time compilation or ahead-of-time compilation. For example, run-time environment 615 may be an implementation of the Android Runtime (ART) used by the Android operating system, in which case platform architecture 600 may substantially resemble that of the Android operating system.

Platform architecture 600 has a further frameworks and services layer 630. Frameworks are software collections that provide a higher-level of abstraction than lower level system libraries, in order to provide some application-specific functions. One example of a framework is the Qt application framework, developed by The Qt Company™, which may be used to develop and implement cross-platform applications and user interfaces.

Services are software programs that may execute autonomously without direct user interaction, for example, without a graphical user interface and as background operations. Services may provide functionality such as storage indexing, power monitoring, logging, networking, and more.

Each of layers 610, 615, 620, 630 and 640 may be implemented in whole or in part as computer-readable program code that can be executed by a processor, such as processor 205 of wearable computing device 210.

Platform architecture 600 has a further application layer 640. Application layer 640 is defined by software application programs, such as interactive programs that accept input from, and produce output for presentation to, a user of the wearable computing device.

Figure 6B:
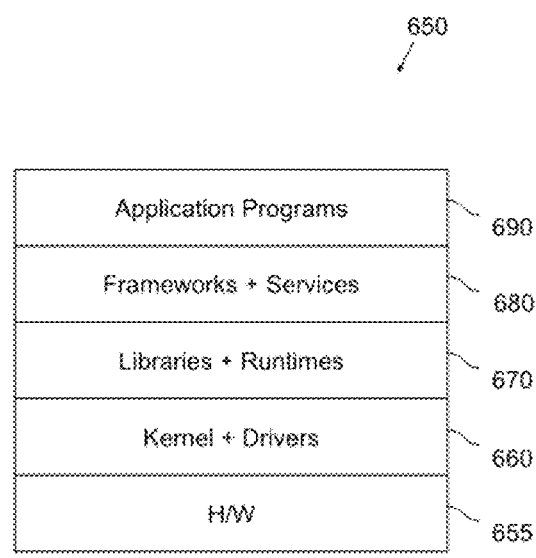
FIG. 6B is a schematic block diagram of an example platform architecture implemented by a host computing device in accordance with some embodiments.

Referring now to FIG. 6B, there is illustrated a schematic block diagram of an example platform architecture implemented by a host computing device, such as host computing device 140 of FIG. 1 and host computing device 440 of FIG. 4. As with platform architecture 600, platform architecture 650 is represented by a "stack" in which successive layers represent increasing levels of abstraction from a bottom physical layer.

Platform architecture 650 has a physical or hardware layer 655, which represents the various physical resources of the host computing device, such as a processor, communication interfaces, storage devices, etc. For example, the physical resources of host computing device 440 described in FIG. 4 may form the hardware layer 655 of the platform in some embodiments.

Platform architecture 650 further has a low-level layer 660, which represents the operating system kernel and device driver software. The kernel represents a lowest-level of abstraction and performs various functions, such as resource management, memory management, device management, and handling of system calls for other programs. For example, the kernel may be responsible for mediating accessing to the host computing device's physical resources found in the hardware layer 655. In some embodiments, the kernel may be a Linux kernel, and the device drivers may be provided for the processor, communication interfaces, storage devices, PMU, etc. Device drivers may be integrated into the kernel (e.g., in a "monolithic" kernel), or may be loadable modules that can be dynamically loaded or unloaded by the kernel as desired.

Platform architecture 650 has a further library layer. Libraries 670 represent system libraries that can be used to carry out core functions of an operating system. Libraries 670 are collections of software functions that can be called by various application programs, frameworks and services. In some cases, libraries 670 may be shared libraries that can be called by a wide variety of different software. For example, shared libraries may include functions for process creation and control, networking, file manipulation, and other routine functions. If the platform architecture 650 is for an Android-based system, libraries 670 may include the Android Architecture Components.

In some embodiments, platform architecture 650 may have a run-time environment (not shown separately). The run-time environment may employ just-in-time compilation or ahead-of-time compilation. For example, in some embodiments, a run-time environment may be provided that is an implementation of the Android Runtime (ART) used by the Android operating system, in which case platform architecture 650 may be, or substantially resemble that of, the Android operating system.

In some implementations or embodiments, the platform architecture 650 may have a run-time environment that implements a virtual machine, in which case the run-time environment translates application code from platform-independent bytecode into native machine code executable by the processor of hardware layer 655. In other implementations or embodiments, the platform architecture 650 may omit the virtual machine, in which case programs may be compiled into machine code for native execution by a processor of the host computing device, without the need for intermediate bytecode.

Platform architecture 650 has a further frameworks and services layer 680. Frameworks are software collections that provide a higher-level of abstraction than lower level system libraries, in order to provide some application-specific functions. If the platform architecture 650 is for an Android-based operating system, one example of a framework is the Java Application Programming Interface (API) framework, which may be used to develop and implement applications and user interfaces for the Android operating system. Similarly, if the platform architecture 650 is for an Apple iOS™ operating system, an example framework may be UIKit.

Services are software programs that may execute autonomously without direct user interaction, for example, without a graphical user interface and as background operations. Services may provide functionality such as storage indexing, power monitoring, logging, networking, and more.

Platform architecture 650 has a further application layer 690. Application layer 690 is defined by software application programs, such as interactive programs that accept input from, and produce output for presentation to, a user of the host computing device. In some embodiments, application layer 690 may have one or more applications configured to communicate with wearable computing device 110; application layer 690 may also have one or more applications unrelated to wearable computing device 110 (e.g., productivity applications, games, etc.)

Each of layers 660, 670, 680 and 690 may be implemented in whole or in part as computer-readable program code that can be executed by a processor, such as processor 405 of host computing device 440.

Figure 7:
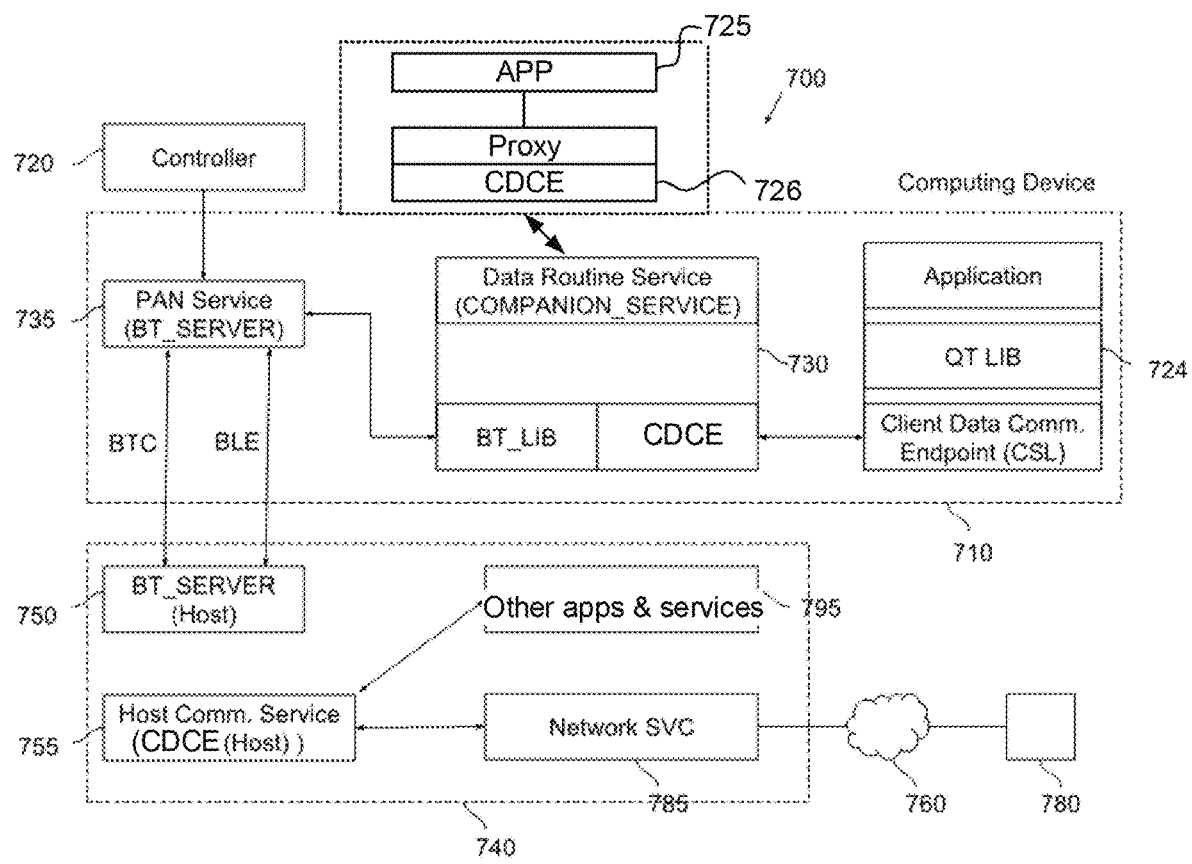
FIG. 7 is a schematic block diagram of an example delegated network access system for a wearable device in accordance with some embodiments.

Referring now to FIG. 7, there is illustrated a schematic block diagram of an example delegated network access system for a wearable device. System 700 generally has a wearable computing device 710—which may be an implementation of wearable computing device 110 of FIG. 1 or wearable computing device 210 of FIG. 2, with a platform architecture as described with reference to FIG. 6A—and a host computing device 740—which may be an implementation of host computing device 140 of FIG. 1 or host computing device 440 of FIG. 4, with a platform architecture as described with reference to FIG. 6B.

Since wearable computing device 710 is equipped with only a personal area network interface, software programs executed by wearable computing device 710 that desire data communications (e.g., with remote computing device 180) may create data packets using a specialized communications library, also called a companion service library, which allows for initial transmission of data via the personal area network interface to the host computing device 740; the host computing device 740 can receive these data transmissions and, using the companion service library, re-transmit them to the network on behalf of the wearable computing device 710. Likewise, host computing device 740 can receive transmissions from the network for delivery to wearable computing device 710.

Wearable computing device 710 may have a controller device 720, such as controller device 120 of FIG. 1. Similarly, host computing device 740 may connect to a network 760, such as network 160 of FIG. 1, and a remote computing device 780, such as remote computing device 180 of FIG. 1.

Host computing device 740 can provide a number of services that are executed by a processor of the host computing device 740. In particular, host computing device 740 may have a host personal area network service 750, a host routing service 755, and a network service 785. Host computing device 740 may also have a variety of other applications and services, shown here as 795 and described elsewhere herein.

The host routing service 755 operates to receive data from the host personal area network service 750, decode or de-encapsulate the data, determine a destination on a network, format or encapsulate the data for transmission via the network, and forward the encapsulated data to the network service 785 for eventual transmission via the network.

Similarly, the host routing service 755 operates to receive "reply" data from network service 785, decode or de-encapsulate the reply data, determine a destination on the personal area network, format or encapsulate the reply data for transmission via the personal area network, and forward the encapsulated reply data to the host personal area network service 750 for eventual transmission via the personal area network. Data routing service 730 of wearable computing device 710 may, upon receiving the reply data, determine which application or service is the intended recipient and forward the reply data accordingly.

Generally, host routing service 755 may implement a host data communications endpoint by calling functions from the companion service library to handle data routing to or from the host device. As noted above, a corresponding companion service library may also be used by the client data communications endpoint in application 724 or proxy service 726. A data routing service 730 of wearable computing device 710 may also make use of the companion service library.

Generally, the companion service library may have related server and client libraries.

The client library may have of a set of APIs and functions that act as an abstraction layer for a subset of the common Portable Operating System Interface (POSIX) Transmission Control Protocol (TCP) networking functions. Specifically, the client library may provide APIs and functions for creating, binding, opening and closing TCP sockets, as well as performing Domain Name System (DNS) queries and domain name resolution. Using the client library functions, the abstracted, open, TCP connections can be emulated with local UNIX domain sockets, which are functionally equivalent at the application layer.

The server library may have a set of APIs, functions and callbacks that can be used to provide a server thread to autonomously manage the connection lifecycle and communications between the various applications or proxy servers that implement client data communication endpoints, and the data routing service 730, which integrates with the server library. The API of the server library facilitates client remote procedure call (RPC) calls for TCP socket operations, as requested by the clients. The callbacks and callouts allow the data routing service 730 to frame RPC requests and socket data when sending it to the host computing device 740, and de-frame command responses and socket data coming from the host computing device 740 before returning it to the client application via the companion service library functions.

In the case of data routing service 730, the server library API functions may be used to frame or de-frame client RPC calls using a protocol buffer messaging protocol, which can be common to both the wearable computing device 710 and host computing device 740.

Host personal area network service 750 operates to receive and transmit data over the wireless interface (e.g., wireless communication interface 441 of host computing device 440) and between host routing service 755 and other applications and services of host computing device 740. In particular, host personal area network service 750 may communicate with a personal area network service 735 of wearable computing device 710 via a general personal area network (e.g., Bluetooth™) or over a low-power personal area network (e.g., Bluetooth™ LE), or both. In some cases, the personal area network service determines which of the general personal area network and low-power personal area network to use for each data packet it transmits, based on a type of the data packet or a session type.

Similarly, network service 785 operates to receive and transmit data over the network interface (e.g., communication interface 445 of host computing device 440) and between host routing service 755 and other applications and services of host computing device 740.

As noted, wearable computing device 710 has a personal area network service 735, a data routing service 730, an application 724 and a proxy service 726.

Application 724 may be a software application that is interactive and therefore makes use of a framework such as Qt, and implements a client data communications endpoint for networked communication via host computing device 740. In particular, the client data communications endpoint allows the application to exchange one or more data messages with data routing service 730 for eventual transmission (or reception) via host computing device 740.

In some cases, the wearable computing device may be provided with applications or frameworks 725 that are not configured or programmed to directly make use of a client data communications endpoint. For example, the applications 725 may be legacy applications or provided by a third-party, and therefore are not configured to take advantage of the client data communications endpoint. In such cases, a proxy service 726 may be provided. Proxy service 726 can be a system service of the wearable computing device that has an instance of the client data communications endpoint (CSL), coupled with a proxy server implementation, which may be bound to a local domain socket. The proxy server implementation may be, for example, an HTTP 1.1 CONNECT method proxy. Accordingly, proxy server 726 implements a client data communications endpoint for networked communication via host computing device 740. In particular, the client data communications endpoint allows certain applications to exchange one or more data messages with data routing service 730 for eventual transmission (or reception) via host computing device 740, even when the application itself is not specifically configured for the client data communications endpoint.

In operation, an application or framework can be configured to use the proxy server to connect to the locally-bound proxy service 726. This allows the application or framework establish an HTTP tunnel, or a secure HTTPS tunnel, to the network 160, via data routing service 750, while abstracting all details of the wearable computing device's PAN and client data communications endpoint away from the application.

Data routing service 730 implements functions from the communications library to provide an intermediate communications node that receives the one or more data messages from the client data communications endpoint, encapsulates the one or more data messages, and routes the one or more data messages to the host data communications endpoint of host routing service 755 via the personal area network service 735, or vice versa.

The client data communications endpoint may implement a socket interface, such as local UNIX domain sockets or TCP sockets or, in at least some embodiments, a hybrid socket interface that allows for both local UNIX domain sockets and/or TCP sockets in a single interface.

The host data communications endpoint may implement a corresponding socket interface, enabling sockets opened by an application program 724 or proxy service 726 of wearable computing device 710 to have endpoints on wearable computing device 710 and host computing device 740.

Personal area network service 735 interacts with a wireless communication interface to communicatively couple the data routing service and the host routing service via a general or low-power personal area network. The general PAN may be, for example, a Bluetooth™ PAN. The low-power PAN may be, for example, a Bluetooth™ LE PAN.

Controller device 720 is generally capable of communicating with the wearable computing device 710 via a low-power personal area network. Personal area network service 735 receives one or more control messages from the controller device 720 via the low-power personal area network and relays the one or more control messages to the data routing service, which can transmit the one or more control messages to an application program or service, where it can be interpreted as input.

As described elsewhere herein, the host computing device can assist the wearable computing device to communicate over a network, such as the Internet, by routing communications received over a personal area network to the network, and vice versa.

However, in some cases, the personal area network connection for some devices may be periodic or time-limited. For example, the host computing device, or the wearable computing device, or both, may periodically disable their personal area network interfaces, e.g., to conserve battery.

In some cases, the operating system of the host computing device may force disablement of the personal area network interface, for example, because of restrictions on the host communications service. In such cases, the wearable computing device may attempt to establish personal area network connection by taking advantage of a low-power personal area network, which may be more readily available. However, in many cases, the low-power personal area network may not be suitable for sustained connections and data transmission due to, e.g., lower data rates than a general personal area network connection. At least some of the described embodiments illustrate methods for allowing the wearable computing device to first initiate a low-power personal area network link, and then use this link to call for the host computing device to enable its general personal area network interface for subsequent linking.

Figure 8A:
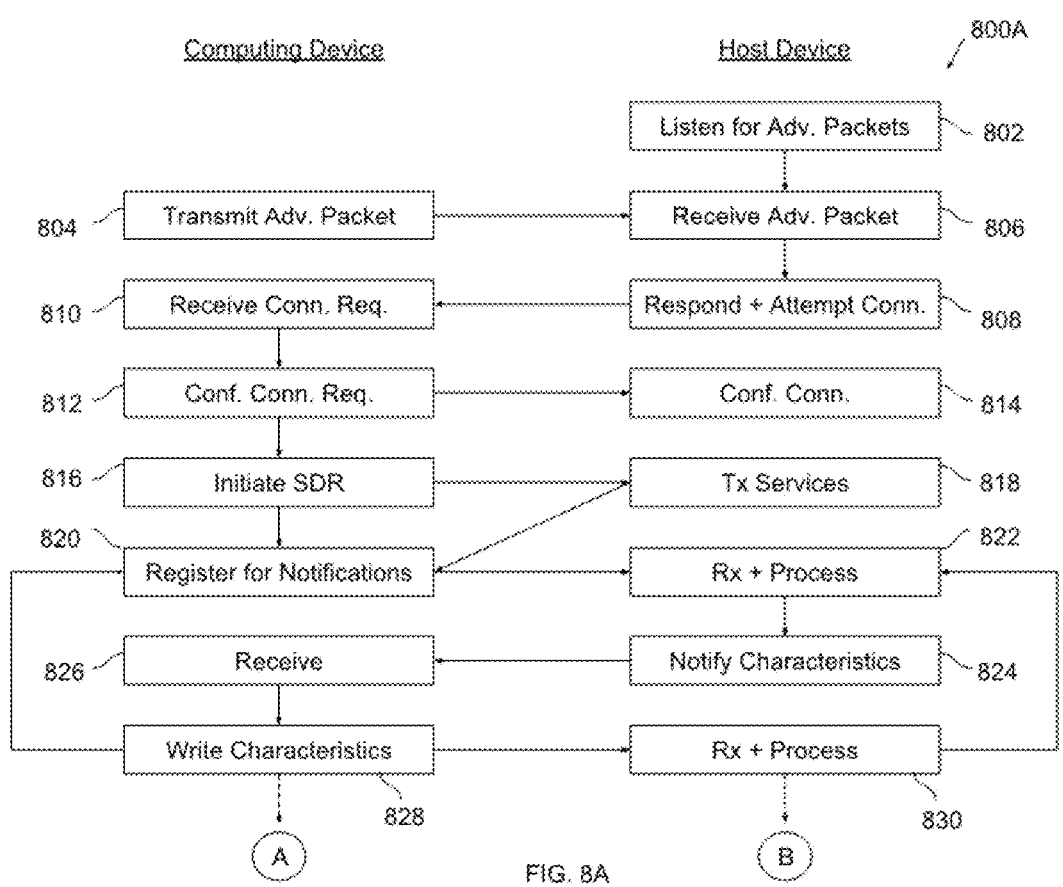
FIG. 8A is a simplified process flow diagram of a method of wirelessly coupling a wearable computing device to a host computing device in accordance with some embodiments.
Figure 8B:
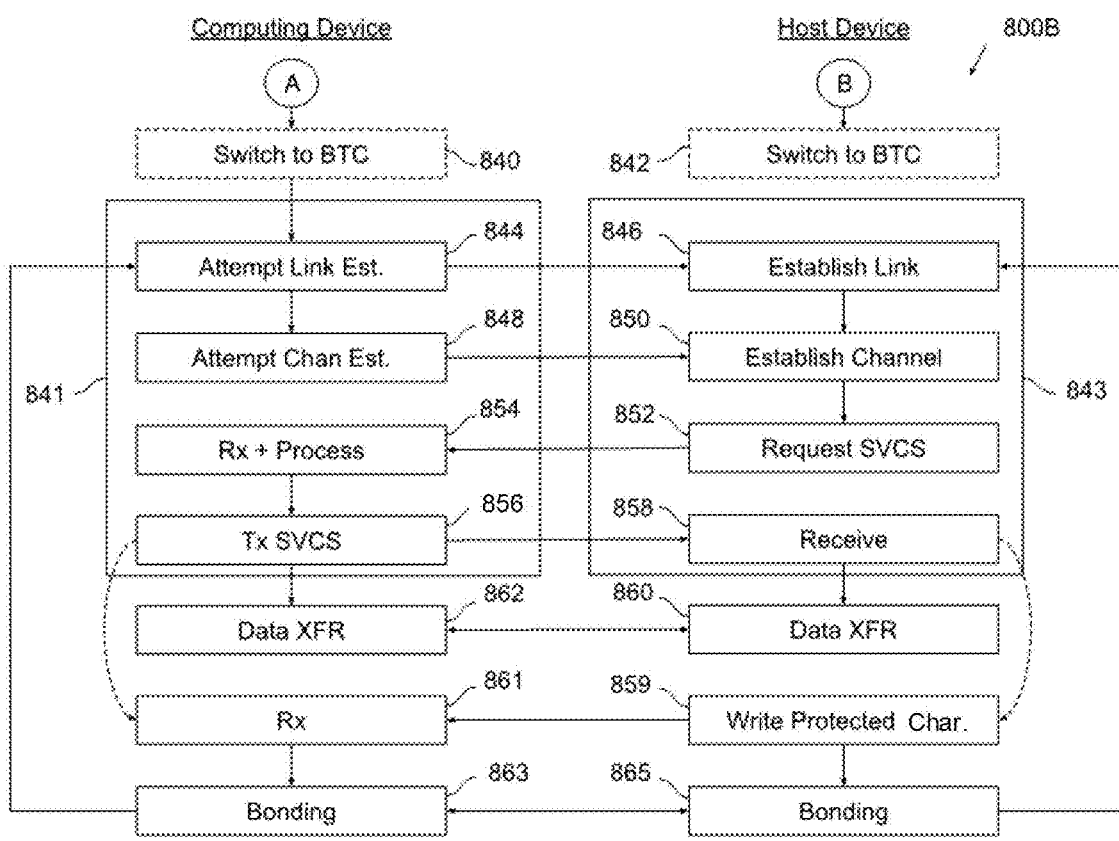
FIG. 8B is a continuation of the simplified process flow diagram of FIG. 8A in accordance with some embodiments.
Figure 8C:
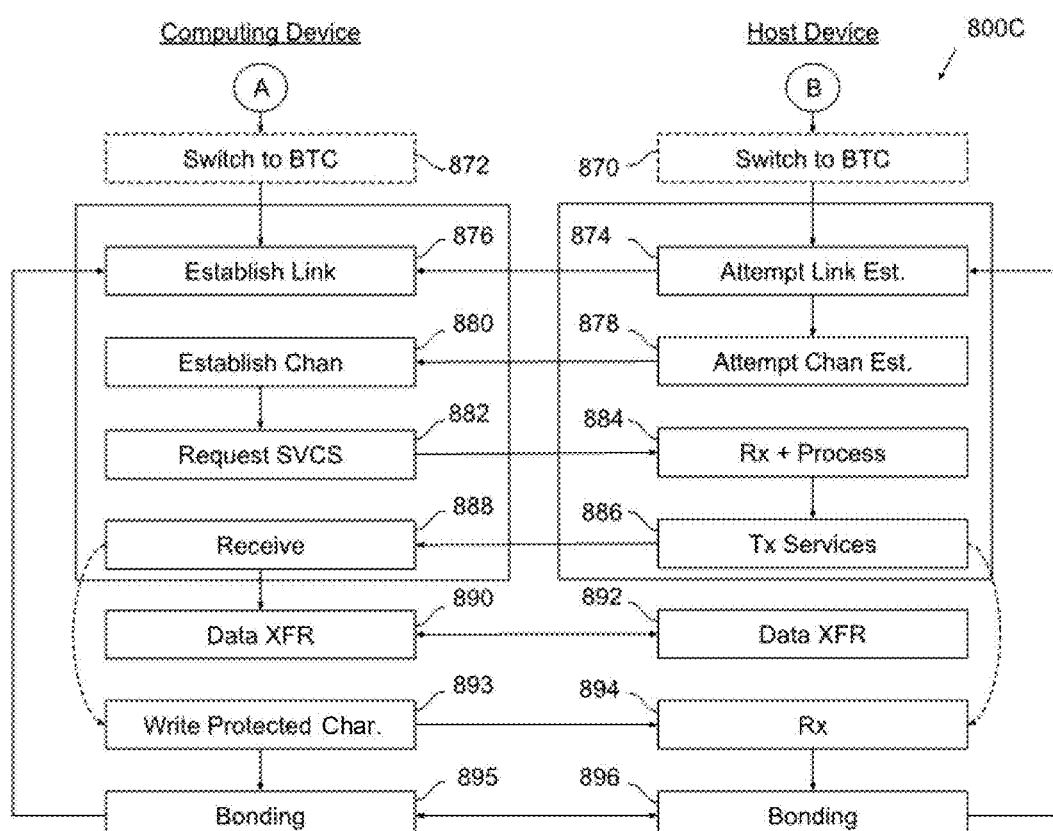
FIG. 8C is a continuation of the simplified process flow diagram of FIG. 8A in accordance with some alternative embodiments.

Referring now to FIGS. 8A to 8C, there are illustrated simplified process flow diagrams for methods of wirelessly coupling a wearable computing device to a host computing device. Methods 800a, 800b, and 800c may be performed by a host computing device, such as host computing device 140 of system 100 depicted in FIG. 1 or host computing device 440 of FIG. 4, and a wearable computing device, such as wearable computing device 110 of system 100 depicted in FIG. 1 or wearable computing device 210 of FIG. 2.

As described elsewhere herein, the host computing device generally has a host processor, a host memory and at least one host wireless communication interface. The host wireless communication interface is generally capable of communication via a low-power personal area network, a general personal area network, or both. The host processor can be configured to carry out portions of the methods 800a, 800b, and 800c depicted as being performed by the host computing device.

Likewise, and as described elsewhere herein, the wearable computing device generally has a device processor, a device memory and at least one device wireless communication interface. The device wireless communication interface is generally capable of communication via the low-power personal area network, the general personal area network, or both. The device processor configured to carry out portions of the methods 800a, 800b, and 800c depicted as being performed by the wearable computing device.

In at least some implementations or embodiments, wireless coupling may be a multi-stage process. For example, in an iOS device, wireless coupling may involve a pre-authorization stage that occurs via a low-power personal area network, such as method 800a. Method 800a begins at 802, with the host computing device entering a mode in which it listens on one or both of its personal area network interfaces (e.g., general and low-power) for advertisement packets.

At 804, the wearable computing device transmits an advertisement packet on the low-power personal area network, such as a Bluetooth™ LE personal area network. In some cases, the wearable computing device may periodically and repeatedly transmit the advertisement packet. In some embodiments, the advertisement packet may contain a Generic Access Profile (GAP) as defined by the Bluetooth™ LE protocol. In at least some implementations or embodiments, the advertisement packet may define the services of a device to which the wearable computing device wishes to connect (e.g., a mobile handset that supports delegated communications), and may contain a request for the recipient device to initiate the further coupling process.

At 806, the host computing device receives the transmitted advertisement packet via the low-power personal area network and processes the advertisement packet to determine that it can offer the requested services.

In response to the advertisement packet, at 808, the host computing device transmits a connection attempt packet to the wearable computing device. In some cases, the host computing device may first attempt to determine if a connection strength is above a connection strength threshold (e.g., to determine if the wearable computing device is "close enough") prior to transmitting the connection attempt packet. In some cases, the host computing device may also first prompt a user to confirm whether to proceed with transmitting the connection attempt packet (e.g., so that the user can confirm that the wearable computing device belongs to the user).

At 810, the wearable computing device receives the connection attempt packet and, optionally, ceases transmission of further advertisement packets for the duration of the low-power personal area network connection, or if a general personal area network connection is later established, for the duration of the general personal area network connection.

At 812, the wearable computing device confirms that the connection attempt was successful by transmitting a success message to the host computing device.

At 814, the host computing device receives the success message.

In some cases, the exchange of connection attempt confirmations and success messages may be referred to as pre-pairing (or in some cases, simply pairing) via the low-power personal area network.

At 816, the wearable computing device initiates service discovery by transmitting a request to the host computing device.

The wearable computing device receives the request at 818 and transmits a services list to the host computing device in response.

At 820, the wearable computing device registers for notifications from the host computing device and, at 822, the host computing device receives the registration request and processes it to begin notifying the wearable computing device of characteristic updates.

At 824, the host computing device determines that a characteristic has been updated (or sends an initial characteristic or characteristics), and transmits a characteristics notification to the wearable computing device. Characteristics may be considered as, for example, containers for user data, also referred to as attributes, which are stored and maintained as part of the services offered by the host computing device.

The wearable computing device receives the characteristics at 826 and processes them as needed. In some cases, the wearable computing device may wish to write characteristics, in which case it may do so by transmitting a write characteristics message to the host computing device in response, at 828. The host computing device receives and processes the characteristics list at 830.

The wearable computing device may return to 820, and the host computing device may return to 822, as additional characteristics are read and written. Characteristic reading and writing may be used to carry out a pre-authorization routine, which can be a prelude to establishing a general personal area network connection.

Upon completion of the pre-authorization routine, in which the wearable computing device may obtain the necessary keys and authorizations to continue with establishing a personal area network connection, the wearable computing device and the host computing device may switch to a general personal area network coupling method, as shown in FIG. 8B or FIG. 8C.

In some embodiments, the wearable computing device may write a characteristic that can be used to call and activate an application program resident on the host computing device. The application program, when called, may activate the general personal area network interface and place it into a pairing ready mode.

Following execution of method 800*a*, the wearable computing device and host computing device are coupled via a low-power personal area network and ready for pairing via a general personal area network. The wearable computing device and host computing device may initiate pairing via the general personal area network, such as a Bluetooth™ personal area network (as distinguished from Bluetooth™ LE), and as described further in method 800*b* or 800*c*.

Referring now specifically to FIG. 8B, this is illustrated a process flow diagram of an example method of continuing method 800*a* of FIG. 8A. The wearable computing device continues from node A of method 800*a*, and the host computing device continues from node B of method 800*a*.

At 840, the wearable computing device activates its general personal area network interface, if it is not already active. Likewise, at 842, the host computing device activates its general personal area network interface, if it is not already active. In some embodiments, the wireless coupling between the wearable computing device and host computing device may begin at this stage, i.e., without the pre-authorization of method 800*a*. For example, in host computing devices that use the Android operating system, the wireless coupling may begin directly with Bluetooth Classic connection.

At 844, the wearable computing device attempts to establish a link with the host computing device via the general personal area network. At 846, the link is established with the host computing device.

At 848, the wearable computing device attempts to establish a channel via the previously established link. At 850, the channel is established.

In response to establishment of the channel, the host computing device may request a services list at 852. The wearable computing device receives the request at 854 and processes the request.

At 856, the wearable computing device transmits a services list in response to the services list request, which is received by the host computing device at 858.

In some cases, such as when the host computing device uses the Android operating system, the wearable computing device and host computing device may be fully coupled or paired at this stage, and may begin to exchange data, at 860 and 862, according to the services agreed upon previously.

In some other cases, such as when the host computing device uses the iOS operating system, further acts may be used to complete wireless coupling. In such cases, the host computing device may write a protected characteristic at 859, which may be received and read at 861. The wearable computing device may begin a bonding key exchange at 863, with the host computing device completing the key exchange at 865. Thereafter, the wearable computing device may repeat acts 841 (i.e., 844 to 856) using the newly acquired keys. Similarly, the host computing device may repeat acts 843 (i.e., 846 to 858) to complete pairing and begin exchanging data at 860 and 862.

Referring now specifically to FIG. 8C, this is illustrated a process flow diagram of an example method of continuing method 800*a* of FIG. 8A. The wearable computing device continues from node A of method 800*a*, and the host computing device continues from node B of method 800*a*.

At 870, the host computing device activates its general personal area network interface, if it is not already active. Likewise, at 822, the wearable computing device activates its general personal area network interface, if it is not already active. In some embodiments, the wireless coupling between the wearable computing device and host computing device may begin at this stage, i.e., without the pre-authorization of method 800*a*. For example, in host computing devices that use the Android operating system, the wireless coupling may begin directly with Bluetooth Classic connection.

At 874, the host computing device attempts to establish a link with the wearable computing device via the general personal area network. At 876, the link is established with the wearable computing device.

At 878, the host computing device attempts to establish a channel via the previously established link. At 880, the channel is established.

In response to establishment of the channel, the wearable computing device may request a services list at 882. The host computing device receives the request at 884 and processes the request.

At 886, the host computing device transmits a services list in response to the services list request, which is received by the wearable computing device at 888.

In some cases, such as when the host computing device uses the Android operating system, the wearable computing device and host computing device may be fully coupled or paired at this stage, and may begin to exchange data according to the services agreed upon previously.

In some other cases, such as when the host computing device uses the iOS operating system, further acts may be used to complete wireless coupling. In such cases, the host computing device may write a protected characteristic at 893, which may be received and read at 894. The wearable computing device may begin a bonding key exchange at 895, with the host computing device completing the key exchange at 896. Thereafter, the wearable computing device may repeat acts 876 to 888 using the newly acquired keys. Similarly, the host computing device may repeat acts 874 to 886 to complete pairing and begin exchanging data at 890 and 892.

In some cases, the host computing device, when using the Android operating system, may listen for low power personal area network (e.g., Bluetooth LE) advertising packets from the wearable computing device, and establish an outbound general personal area network (e.g., Bluetooth Classic) connection to the wearable computing device, allowing the connection to be maintained thereafter. The wearable computing device can be in a listening/connectable state when it broadcasts the low power personal area advertising packets.

In some cases, such as when the host computing device uses the iOS operating system, the host computing device may listen for low power personal area network (e.g., Bluetooth LE) advertising packets from the wearable computing device, and establish an outbound low power personal area network connection to the wearable computing device in response. A host computing device when using the iOS operating system may expect a low power personal area network connection from the wearable computing device. Based on determining that the host computing device is using the iOS operating system, the wearable computing device may determine that it should establish a general personal area network connection (e.g., Bluetooth Classic) with the host computing device, and may attempt to maintain the general personal area network connection active for as long as the low power personal area network connection is present. The wearable computing device may determine that the host computing device is using the iOS operating system based on its pairing with the host computing device via the low power personal area network, or from a prior session.

Figure 9A:
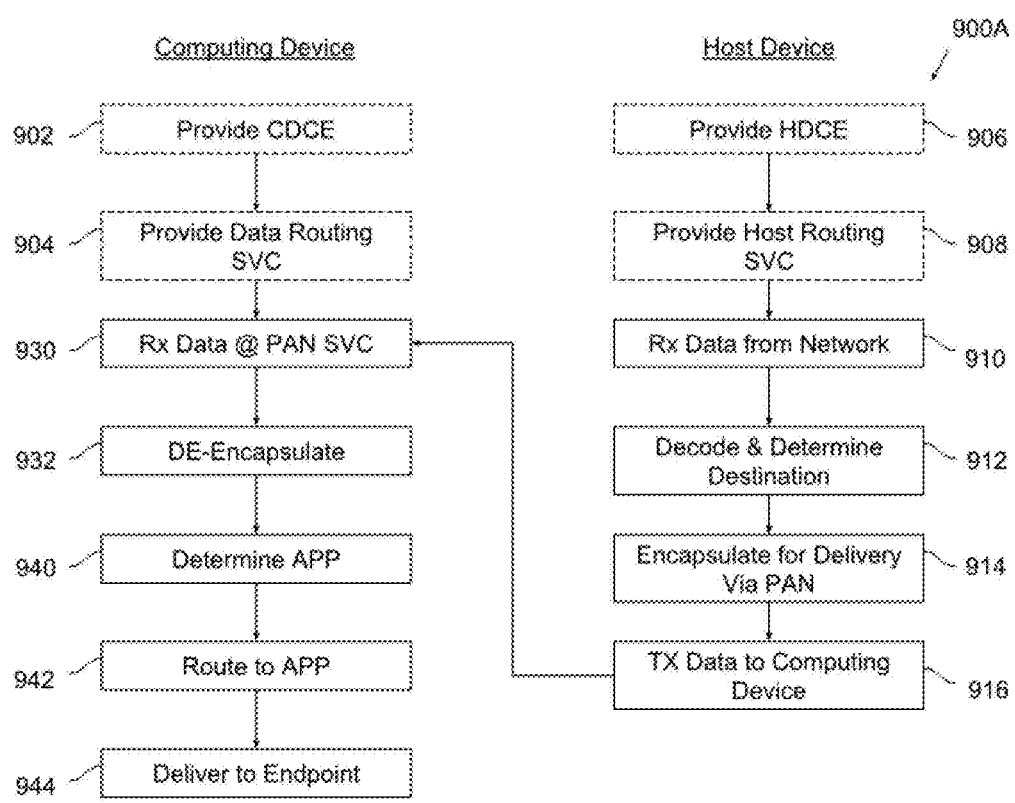
FIG. 9A is a simplified process flow diagram of a method of facilitating communication between a wearable computing device and a remote network via a host computing device connected to the remote network in accordance with some embodiments.
Figure 9B:
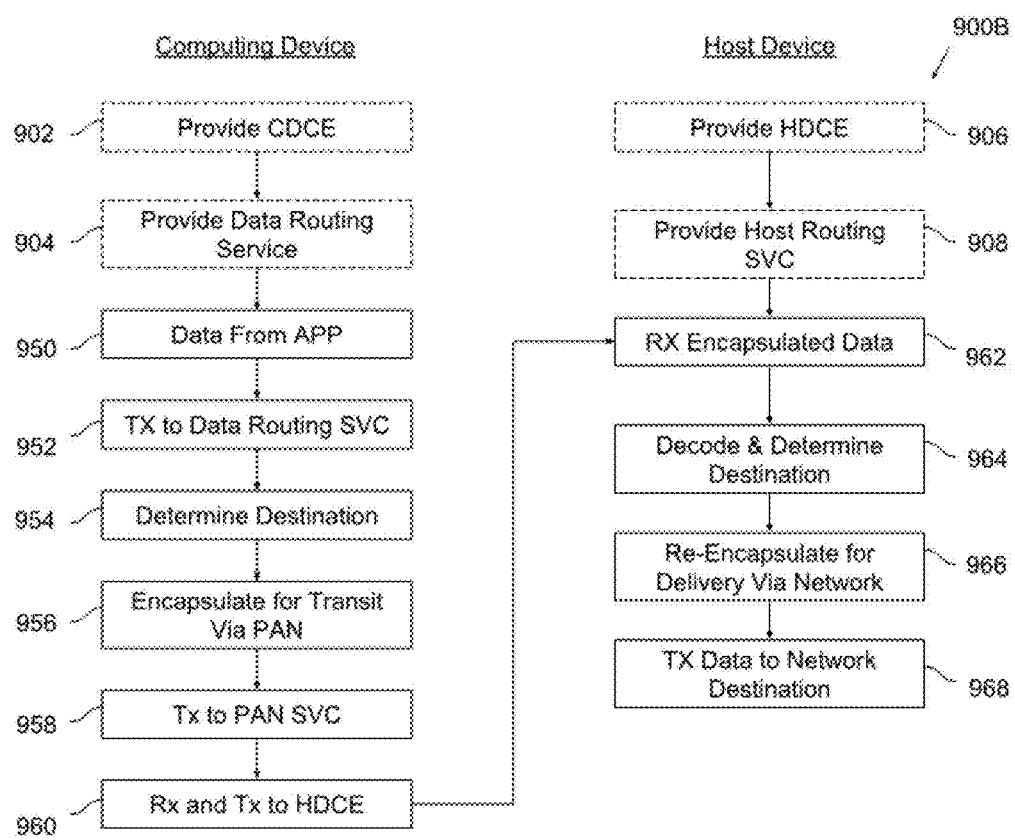
FIG. 9B is a simplified process flow diagram of a method of facilitating communication between a wearable computing device and a remote network via a host computing device connected to the remote network in accordance with some embodiments.

Referring now to FIGS. 9A and 9B, there are illustrated a simplified process flow diagram of a method of facilitating communication between a wearable computing device and a remote network via a host computing device connected to the remote network. Methods 900a and 900b may be performed by a host computing device, such as host computing device 740 of system 700 depicted in FIG. 7, and a wearable computing device, such as wearable computing device 710 of system 700 depicted in FIG. 7.

As described elsewhere herein, the host computing device generally has a host processor, a host memory and at least one host wireless communication interface. The host wireless communication interface is generally capable of communication via a low-power personal area network, a general personal area network, or both. As described herein, the host computing device may execute a host routing service which provides a host data communications endpoint. The host processor can be configured to carry out portions of the methods 900a and 900b depicted as being performed by the host computing device.

Likewise, and as described elsewhere herein, the wearable computing device generally has a device processor, a device memory and at least one device wireless communication interface. As described herein, the wearable computing device may execute a data routing service, and may execute application programs which interface with a client data communications endpoint. The device wireless communication interface is generally capable of communication via the low-power personal area network, the general personal area network, or both. The device processor configured to carry out portions of the methods 900a and 900b depicted as being performed by the wearable computing device.

Method 900a begins with the wearable computing device providing the client data communications endpoint at 902 and data routing service at 904. Similarly, the host computing device provides the host data communications endpoint at 906 and host routing service at 908.

At 910, the host computing device receives a data packet from the network and forwards the data to the host routing service. The data packet may be formatted according to an Internet Protocol.

At 912, the host routing service analyzes the data packet and determines that the destination of the packet is the wearable computing device.

In response, at 914, the host routing service encapsulates the packet using a transport protocol and addresses the encapsulated packet to the wearable computing device. When encapsulating, each packet may be associated with a connection identifier, which can be unique for each discrete socket that is accessing the physical channel. In this way, packets can be transmitted and received for multiple discrete sockets concurrently, while still being delivered over a single physical channel. In some cases, encapsulation may be performed using Google Protocol buffers. However, in some cases, the transport protocol may enable the transmission of arbitrary data outside of Protocol buffer messages, which can facilitate companion service library operation.

At 916, the host routing service transmits the encapsulated packet to the host personal area network service, which transmits the encapsulated packet to a counterpart service of the wearable computing device via the personal area network.

At 930, the personal area network service of the wearable computing device receives the encapsulated packet and forwards it to the data routing service.

At 932, the data routing service de-encapsulates the packet and determines a local destination.

At 940, the wearable computing device determines the destination application (or proxy service) for the de-encapsulated packet and, at 942, the de-encapsulated packet is forwarded to the destination. Finally, upon receiving the de-encapsulated packet, the companion service library of the destination application can then deliver the packet to the local destination at 944. Generally, the local destination is an application program that can receive the data packet and process it as desired.

Method 900a may be performed substantially in reverse when the direction of data transmission is from the wearable computing device to the network.

Method 900*b* begins with the wearable computing device providing the client data communications endpoint at 902 and data routing service at 904. Similarly, the host computing device provides the host data communications endpoint at 906 and host routing service at 908.

At 950, an application program executed by the wearable computing device generates a data packet and interfaces with a client data communications endpoint to transmit the packet.

At 952, the data packet is transmitted to the data routing service, which determines a destination for the data packet at 954. The data routing service can, in some cases, use a priority queuing mechanism to allow for certain types of data traffic to be given priority over less important traffic. For example, over-the-air software updates or analytics data may be given lower priority than real-time navigation data.

At 956, the data routing service encapsulates the packet in a transport protocol and forwards the encapsulated packet to the wearable computing device personal area network service at 958.

At 960, the personal area network service transmits the encapsulated packet to the host computing device, via the personal area network.

At 962, the personal area network service of the host computing device receives the encapsulated packet. The encapsulated packet is de-encapsulated by the host routing service at 964 and its network destination is determined.

Optionally, at 966, the packet may be formatted according to an Internet Protocol, if it is not already so formatted.

At 968, the packet is forwarded to a network service, where it is then transmitted via the communications interface to the network and its eventual destination, such as a remote computing device.

Method 900*b* may be performed substantially in reverse when the direction of data transmission is from the wearable computing device to the network.

The client data communications endpoint and the host data communications endpoint described herein each may be implementations of a client-side and a host-side socket interface, respectively. Both socket interfaces may be implementations of Unix-style sockets, Internet sockets, or both.

Referring to FIG. 10A, shown therein is a perspective view of a ring body member 1002 of a controller device, such as controller device 120, according to one embodiment. The ring body member 1002 can be worn around a user's finger. The shape of the ring body member 1002 is shown for illustrative purposes and is not limited to the illustrated shape. Other shapes can be used. For example, the ring body member 1002 can have a general shape of a circular band, a helix, or a spiral. The ring body member 1002 can have any appropriate shape that allows the ring body member to remain positioned around the user's finger.

A ring body member 1002 having a tear drop shape is shown in FIG. 10A. The ring body member 1002 has an upper end 1004 and a lower end 1006.

In another embodiment, the ring body member can have a spiral shape or a helical shape.

In another embodiment, the ring body member can have a circular band shape. With a circular band shape, the radius of the ring body member is generally constant.

In some embodiments, the ring body member can have at least one break. The break can allow the ring body member to expand. When the ring body member can expand, it can accommodate or tolerate fingers have different ring sizes.

The ring body member 1002 can be formed of a conductive material. For example, the conductive material can be, but is not limited to a metal such as aluminum or copper, or any combination thereof.

In some embodiments, the ring body member 1002 can be formed of a non-conductive material. The ring body member 1002 can include an insert. When the ring body member 1002 is formed of a non-conductive material, the insert can be metallic.

The ring body member 1002 can be coated. For example, the ring body member 1002 can be coated with paint. In another example, the ring body member 1002 can be coated with a conductive material.

The ring body member 1002 can have a controller device 1008. In some embodiments, the controller device 1008 may have a joystick portion 1009. The joystick portion may be movable in two or more axes. For example, the joystick may be movable in lateral x- and y-axes. In some embodiments, the joystick may also be movable in a third vertical axis, or z-axis, which may be used to indicate selections. The joysticks may be biased, e.g., with a spring or elastic member, to a starting position.

The ring body member 1002 can include a filler member positioned within the break and connecting the first end portion and the second end portion. The filler member can be formed of a dielectric material.

Referring to FIGS. 10B and 10C, shown therein is a perspective view and a block diagram representation of an electronic circuit 1010 housed within the ring body member 1002 shown in FIG. 10A, according to one embodiment.

In some implementations or embodiments, the electronic circuit 1010 shown in FIGS. 10A and 10B can be mounted on a flexible printed circuit board (PCB) 1012. In some embodiments, some or all of the electronic circuit 1010 can be mounted on a reinforcement member for increasing the stiffness of the apparatus. For example, the reinforcement member can be formed of a metallic material.

The electronic circuit 1010 can include a communication interface 1040, a first arm 1020 and a second arm 1050 of a radiofrequency antenna. When the communication interface 1040 is located between the first arm 1020 and the second arm 1050, causing a disconnect between the first arm 1020 and the second arm 1050, the electronic circuit can form a dipole antenna. The first arm 1020 is connected to an RF feed 1030. The second arm 1050 includes a ground patch 1052 mounted on a ground plane surface 1054. That is, the second arm 1050 is connected to ground.

The communication interface 1040 can be facilitate communication via a communication network. The communication interface 1040 can be a Bluetooth™ Low Energy chip having a signal frequency of about 2400 MHz to about 2500 MHz. In some embodiments, the communication interface 1040 can operate signals having a frequency in a band of 100 MHz, 200 MHz, 300 MHz, 400 MHz, 800 MHz, and 900 MHz.

The electronic circuit 1010 can also include additional electronic components which can be collectively referred to as 1030, such as a harvester unit 1032 capable of harvesting energy, a sensor unit 1034 for detecting hand gestures made by the user and generating signals based on the gestures; and an electrical energy storage 1036 component capable of storing energy harvested by the harvester unit and providing power to the electronic circuit.

The harvester unit can be a piezoelectric harvester unit. In some embodiments, the harvester unit can harvest energy from direct impact. In some embodiments, the harvester unit can harvest energy from vibrations. In some embodiments, the harvester unit can be an electrodynamic harvester unit. The additional electronic components can also include an AC-DC converter (not shown). The additional electronic components 1030 is shown for illustrative purposes and is not limited to the illustrated shape, sizes, or positions shown.

As noted, the wearable computing devices described herein, such as wearable computing device 110 of FIG. 1, wearable computing device 210 of FIG. 2 and/or wearable computing device 710 of FIG. 7 may, in some embodiments, be head-mounted eyeglasses devices, also referred to as wearable heads-up displays or head-mounted displays.

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date are bulky to enable adequate display performance and, as a result, appear very unnatural on a user's face compared to the sleeker and streamlined look of typical eyeglass and sunglass lenses. However, a traditional eyeglasses frame is problematic when correct alignment of optical components carried by the eyeglasses frame is a necessity for a high quality display. Because traditional eyeglasses have hinges where the arms meet the rest of the frame, any optical components carried on the arms may move relative to the rest of the frame or to the eye of the user while being worn, resulting in loss of or distortion of the display. There is a need in the art for means to successfully integrate electronic components into smaller frames in order to achieve the inconspicuous form factor and fashion appeal expected of the eyeglass frame industry while still maintaining a high display quality.

Another important factor in the design of electronic devices, including wearable heads-up displays, is the integration of components that allow for communication between devices. Examples of systems that integrate such inter-device connectivity are smart phones, watches, and headphones with Bluetooth® radio antennas. However, the design form factor and location of an antenna within an electronic device is important because the location of the antenna relative to other components, both electronic and non-electronic, within the device impacts the functionality of the antenna. In some cases, interference from other components within the device significantly reduces the range, signal strength, and overall connectivity capabilities of the antenna, thus preventing the antenna from effectively connecting or communicating with other electronic devices. In many cases, a similar result occurs depending on the distance and orientation of the antenna relative to an external device with which the antenna is communicating. As such, there remains a need in the art for integrating radio antennas into a compact, aesthetically-pleasing form factor for a wearable heads-up display in order to maximize connectivity, range, and signal strength of the antenna, regardless of the position of an external device relative to the antenna over a given range.

In at least some embodiments, a wearable heads-up display may be provided in the form of eyeglasses frames and eyeglasses frames assemblies carrying an antenna for inter-device connectivity. Such glasses may include a minimal form factor that is aesthetically pleasing and an antenna design that enables superior range, signal strength, and overall connectivity capabilities of the antenna.

Figure 11:
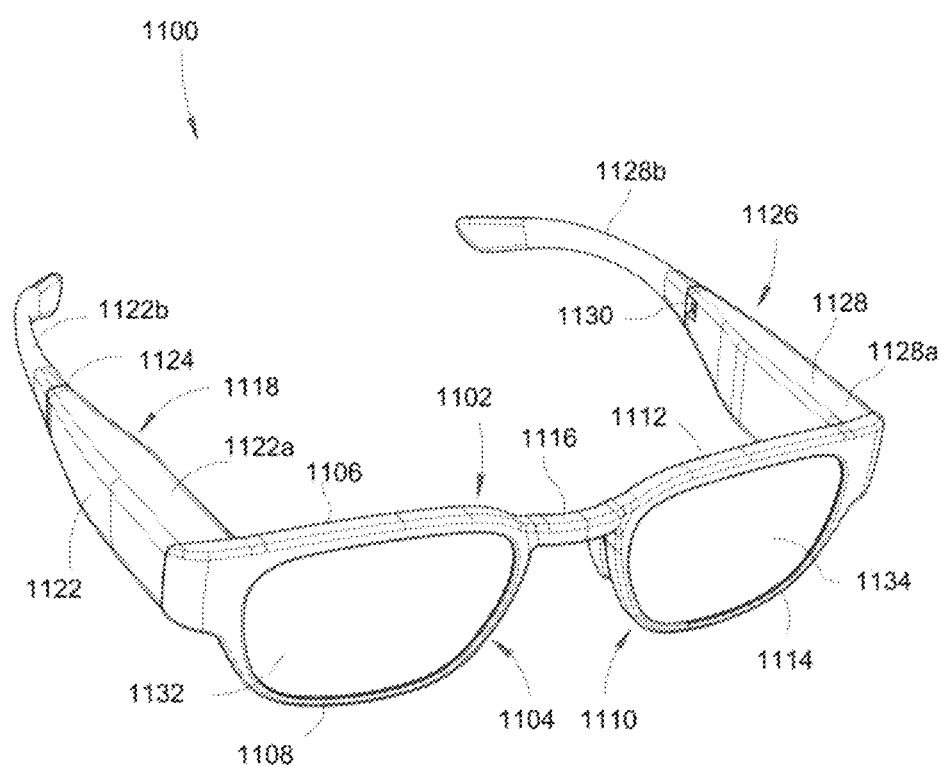
FIG. 11 is a perspective view of an exemplary implementation of a glasses frame formed according to the present disclosure.

FIG. 11 illustrates an exemplary implementation of eyewear in the form of a pair of eyeglasses 1100 having a first arm 1118, a second arm 1126 and a front eyeglass frame 1102 formed in accordance with the present disclosure. The front eyeglass frame 1102 includes a first rim 1104 having a first upper peripheral portion 1106 and a first lower peripheral portion 1108. The front eyeglass frame 1102 further includes a second rim 1110 having a second upper peripheral portion 1112 and a second lower peripheral portion 1114 and a bridge 1116 securely physically coupling the first rim 1104 and the second rim 1110. In an implementation, the bridge 1116 is coupled to the first rim 1104 and the second rim 1110 between the first upper peripheral portion 1106 and the second upper peripheral portion 1112. In addition, the front eyeglass frame 1102 may be formed as a single, unitary, integral piece or as separate components fastened together with one or more adhesives, screws, or other fasteners.

Eyeglasses 1100 also include the first arm 1118 coupled to the first rim 1104 and having a first temple portion 1122. Temple portion 1122 is preferably hollow in order to house certain components as described herein. In an implementation, first arm 1118 is stiff and inflexible such that when first arm 1118 is coupled to the front eyeglass frame 1102, first arm 1118 maintains a fixed position relative to the front eyeglass frame 1102. In the illustrated implementation, there is no hinge connecting the arm 1118 of the eyeglasses 1100 to the front eyeglasses frame 1102, in contrast to traditional eyeglasses, although other implementations include such a hinge.

Further, in an implementation, the first temple portion 1122 has a first hinge 1124 which separates first temple portion 1122 into a first anterior part 1122*a* and a first posterior part 1122*b*, wherein first posterior part 1122*b* folds in towards the front eyeglasses frame 1102. In other words, the first hinge 1124 is coupled between the first anterior part 1122*a* and the first posterior part 1122*b* such that the first posterior part 1122*b* is rotatable relative to the first anterior part 1122*a* and the front eyeglass frame 1102 about the first hinge 1124 along at least one axis of rotation passing through the first hinge 1124.

The pair of eyeglasses 1100 includes a second arm 1126 coupled to the second rim 1110 having a second temple portion 1128. Second temple portion 1128 is hollow. In an implementation, second arm 1126 is stiff and inflexible such that when second arm 1126 is coupled to the front eyeglass frame 1102, second arm 1126 maintains a fixed position relative to the front eyeglass frame 1102. There is no hinge connecting the second arm 1126 of the eyeglasses 1100 to the front eyeglasses frame 1102, in contrast to traditional eyeglasses.

In an implementation, second temple portion 1128 has a second hinge 1130 which separates second temple portion 1128 into a second anterior part 1128*a* and a second posterior part 1128*b*, wherein second posterior part 1128*b* folds in towards the front eyeglasses frame 1102. In other words, the second hinge 1130 is coupled between the second anterior part 1128a and the second posterior part 1128b such that the second posterior part 1128b is rotatable relative to the second anterior part 1128a and the front eyeglass frame 1102 about the second hinge 1130 along at least one axis of rotation passing through the second hinge 1130.

Temple portions 1122 and 1128 each preferably sit on, and extend beyond, a respective ear of a user to hold eyeglasses 1100 on a head of the user. The front eyeglass frame 1102 further includes a first lens 1132 mounted in the first rim 1104 and a second lens 1134 mounted in the second rim 1110. As such, front eyeglass frame 1102 has the shape and appearance of a front of a traditional pair of eyeglasses. Lenses 1132 and 1134 may be inserted and held in respective rims 1104 and 1110 by an interference fit, friction fit, press fit, or by a heat/shrink fit. Each of rims 1104 and 1110 is of a size and shape that can receive the respective lens 1132 and 1134 and hold the lenses 1132 and 1134 in place without any movement once the lenses 1132 and 1134 are inserted. Assembly of the eyeglasses 1100 may include the technology described in U.S. Provisional Patent Application No. 62/609,607 and U.S. Provisional Patent Application No. 62/634,654.

In an implementation, eyeglasses 1100 are a wearable heads-up display wherein display-producing components are present within or carried by one or both arms 1118 and 1126 (i.e., one arm for a monocular display, both arms for a binocular display) and display components are embedded within or carried by one or both lenses 1132 and 1134. In addition, as described in more detail below, the eyeglasses 1100 may include an antenna (not shown) and a power source (not shown) to power circuitry (e.g., processor, radio (e.g., transmitter, receiver or transceiver coupled to one or more antenna)) in order to provide inter-device connectivity between the glasses 1100 and external electronic devices, such as a smart phone (not shown) or a ring worn on the user's finger as shown in FIGS. 10A to 10C, or that implements the technology described in U.S. Provisional Patent Application No. 62/236,060, U.S. patent application Ser. No. 15/282,535 (published as U.S. Patent Publication 2017/0097753), and U.S. patent application Ser. No. 15/799, 642 (published as U.S. Patent Application Publication 2018/ 0067621).

In an implementation, the arms 1118 and 1126 carry certain display-producing components, for example one or more of a projector (e.g., a scanning laser projector with laser diodes), or may be a micro-display (e.g., liquid crystal display (LCD) or organic light emitting diode (OLED) display). The display components embedded in the lenses 1132 and 1134 may be a waveguide which receives light from the display-producing components and guides the light towards an eye of the user, or may be a reflector, refractor, or diffractor, for example a holographic optical element. The fixed position of at least the anterior portions 1122a and 1128a of the arms 1118 and 1126 relative to the front eyeglasses frame 1102 may enable correct initial and "in-use" positioning of components such as the projector and holographic optical element, in implementations where such components are used.

The various implementations described herein provide a compact, aesthetically pleasing glasses form factor that includes an antenna and a radio for enabling inter-device connectivity. Further, because a location, orientation and position of the antenna is adjustable relative to other electrical components, such as a power source and an electrically conductive path, interference between the antenna and other components within the eyeglass is minimized. As a result, implementations of the present disclosure allow for optimization of the connectivity, range, and signal strength of the antenna when transmitting or receiving signals from other electronic devices. In particular, implementations of the present disclosure enable optimal connectivity, range, and signal strength characteristics for the antenna and the radio regardless of the position of an external device within a given range.

Figure 12A:
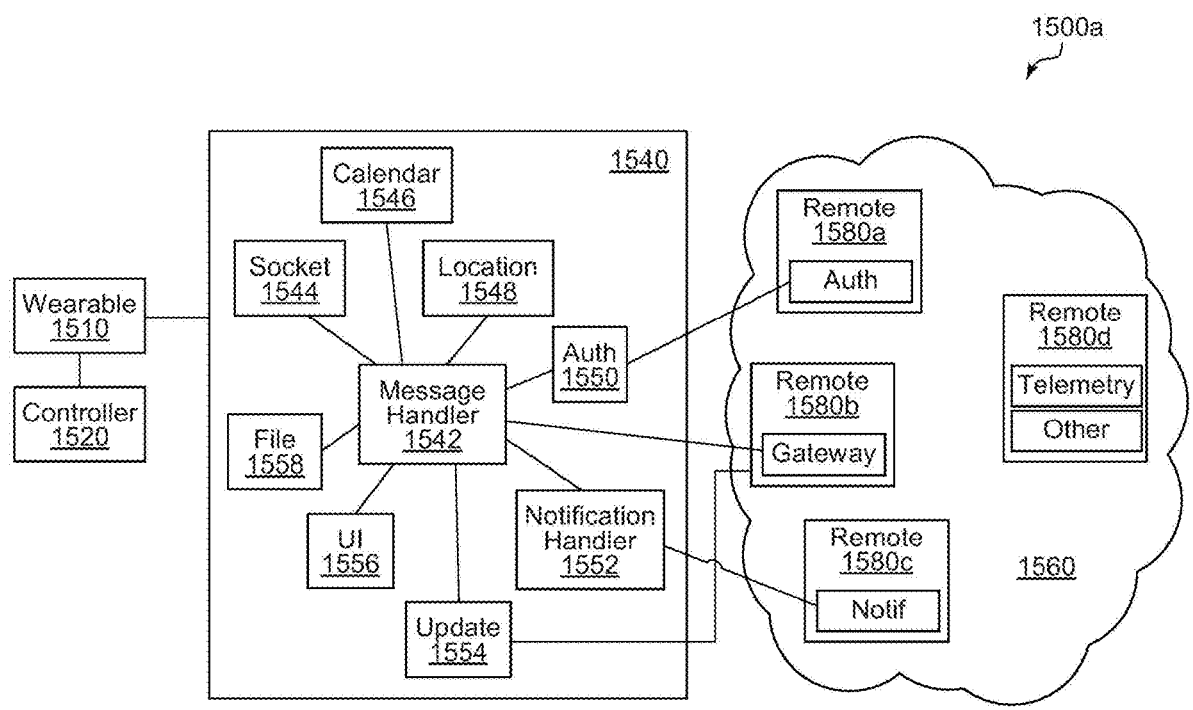
FIG. 12A is a simplified schematic block diagram of an example system architecture in accordance with some embodiments.

Referring now to FIG. 12A, there is illustrated a simplified schematic block diagram of an example system architecture in accordance with some implementations or embodiments. Accordingly, system architecture 1500a illustrates devices of the system, such as a wearable computing device 1510, a controller device 1520, a host computing device 1540, remote computing devices 1580a to 1580d and a data communication network 1560. Each of these devices may be an implementation or embodiment of the respective devices in system 100, such as wearable computing device 110, host computing device 140, and so forth.

In addition, system architecture 1500a also illustrates internal modules of host computing device 1540 and of the remote computing devices 1580a to 1580d. Remote computing devices 1580a to 1580d generally provide one or more services—in a cloud microservices architecture—that can be used by applications or local services of the wearable computing device 1510 or host computing device 1540. For example, remote computing device 1580a provides a gateway service that coordinates communications between the host computing device 1540 and other remote computing devices, such as remote computing device 1580d. Similarly, remote computing device 1580a provides an authentication service, remote computing device 1580c provides a notification service. Remote computing device 1580d provides a telemetry service and other services.

Although FIG. 12A depicts only four remote computing devices 1580a to 1580d, in other implementations, there may be more or fewer remote computing devices. In addition, as used herein, the term "microservice" or "cloud microservice" refers to a server module hosted at a remote computing device, generally as part of a loosely-coupled architecture, and with fine-grained servers and lightweight protocols. The term "service" may be used to refer to a "microservice" herein in cases where the microservice is provided by a remote computing device (e.g., remote computing device 180 or 1580).

In at least some implementations or embodiments, host computing device 1540 may also have modules that provide various services local to the host computing device, and which can communicate with cloud microservices via a message handler module 1542.

Host computing device may have a socket module 1544, a calendar module 1546, a location module 1548, an authentication module 1550, a notification handler 1552, an update module 1554, a user interface module 1556 and a file module 1558. Each of these modules may interact with message handler 1542, which centralizes data communications to and from external devices, and can coordinate data communication in a power- or data-efficient manner, or both.

In some implementations, socket module 1544 may be used to handle protocol encapsulation and de-encapsulation, for example by using the companion service libraries described herein. In some cases, socket module 1544 may implement a host routing service, such as host routing service 755.

Calendar module 1546 may interact with local calendar services of the host computing device 1540 (e.g., Apple or Google calendar services), and may add, update or delete calendar entries based on input from the wearable computing device 1510. Similarly, calendar module 1546 may retrieve calendar data from the local calendar services, and send the calendar data, such as notifications or alerts, to a calendar service of the wearable computing device.

Location module 1548 may interact with local location services of the host computing device 1540 (e.g., GNSS/GPS services) to retrieve a current location of the host computing device 1540, which can be provided to a navigation service of the wearable computing device. Since the host computing device and wearable computing device are generally linked via a short-range personal area network, the navigation service of wearable computing device can leverage the host computing device's location to determine its own location.

Authentication module 1550 can interact with an authentication service of a remote computing device 1580a. Authentication module 1550 can be used to authenticate the host computing device as described elsewhere herein, for example by retrieving an access token and refresh token, which can be used to authenticate with other services provided by remote computing devices 1580b, 1580c and 1580d, for example.

Notification handler 1552 can interact with a notification service of remote computing device 1580c to receive notifications that may contain data for the host computing device 1540 or for wearable computing device 1510. The notification data may be informational, or may contain one or more actions that can be acted upon by the host computing device or wearable computing device. Notification services can be, e.g., Apple Notification Center Service (ANCS), Firebase Cloud Messaging (FCM) and others.

In some implementations, update module 1554 can receive system software updates that may be held, or staged, until further processing or transmission can be performed. For example, update module 1554 may be used to stage one or more system software updates for later delivery to the wearable computing device for updating the firmware of the wearable computing device.

File module 1558 can receive file or message data that may be held, or stored, until further processing or transmission can be performed. For example, file module 1554 may be used to store one or more files or message data, such as photos or short message service (SMS) data, for later delivery to the wearable computing device.

User interface module 1556 can interact with a user interface of a remote configuration application of the host computing device 1540, for configuring settings of the wearable computing device 1510 at the host computing device. UI module 1556 can interface with the remote configuration application to transfer data between the application and a counterpart service of the wearable computing device.

As noted, the above-described modules can interact with message handler 1542. Message handler 1542 generally serves to interact with a master service of the wearable computing device 1510 and one or more microservices provided by remote computing devices 1580a to 1580d. Message handler 1542 can consolidate messages received from each of the local modules and handle delivery to the appropriate cloud microservice, e.g., via the gateway service of remote computing device 1580b. Similarly, message handler 1542 can receive consolidated messages from cloud microservices, e.g., via the gateway service of remote computing device 1580b and deliver the individual messages to the appropriate local module for further processing.

Message handler 1542 can perform similar functions for communication with the wearable computing device 1510, consolidating and distributing messages both to and from, respectively, the wearable computing device 1510. In particular, message handler 1542 can communicate with a local message handler of the wearable computing device which serves as the counterpart to message handler 1542.

Figure 12B:
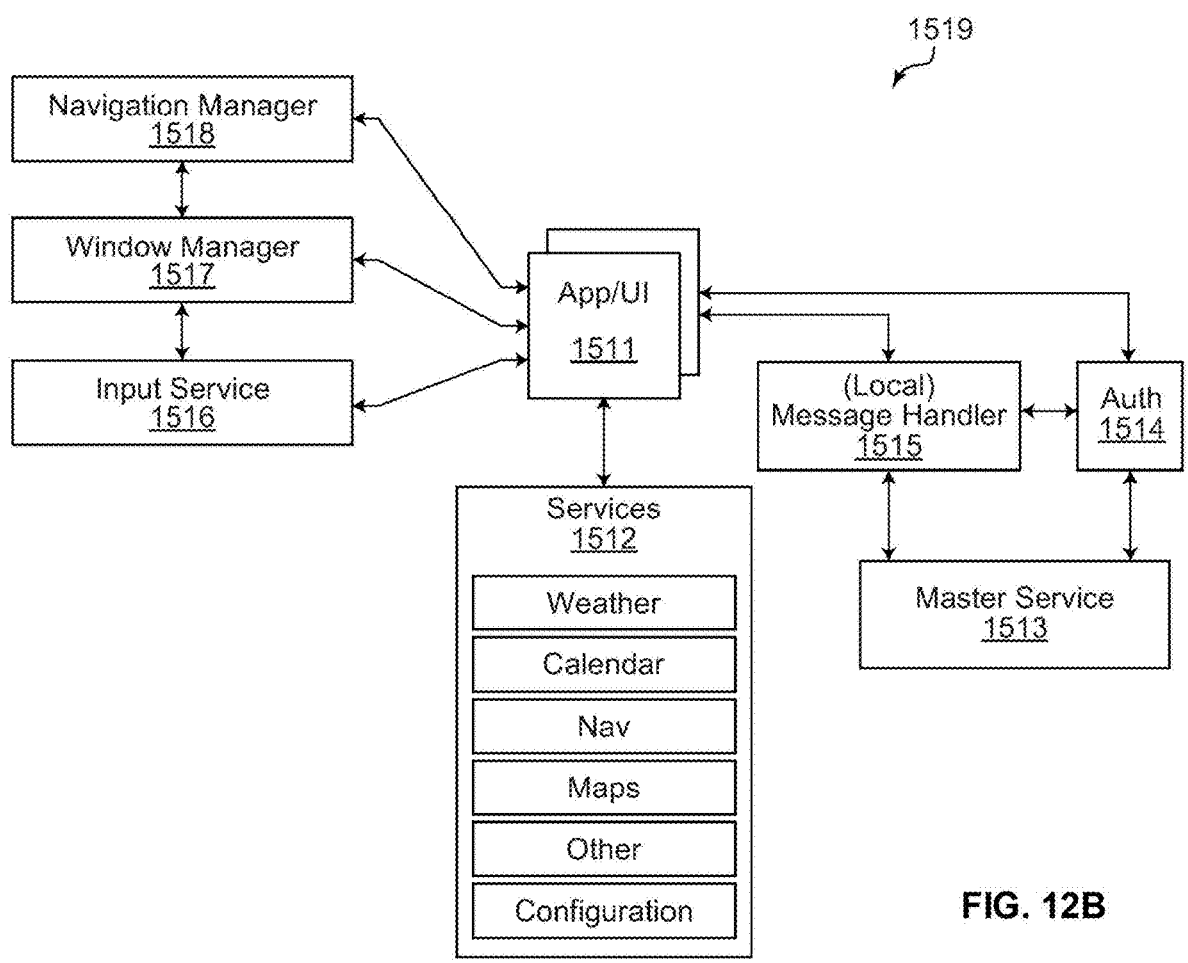
FIG. 12B a simplified schematic block diagram of an example system architecture of the wearable computing device of FIG. 12A.

Referring now to FIG. 12B, there is illustrated a simplified schematic block diagram of an example system architecture of wearable computing device 1510 of FIG. 12A. Accordingly, system architecture 1519 illustrates modules and data flows within the wearable computing device 1510.

System architecture 1519 illustrates that the wearable computing device 1510 has a window manager 1517 that serves to allocate and manage display buffers on behalf of application programs and a user interface 1511. In some implementations, the window manager 1517 may have an extensible architecture, allowing for plugins to provide for added functionality. One such plugin may be an input service 1516, which can provide handling of the buffers to the application programs and user interface.

Another plugin may be a UI navigation manager 1518, which can receive user input and direct the window manager 1517 to arrange the application programs in the user interface according to the user's wishes, for example by maintaining a virtual application stack for navigating applications. The virtual application stack may order a plurality of application programs, e.g., based on most recent use, frequency of use, or based on a predetermined order.

An authentication module 1514 can provide authentication services for the application programs 1511, communicating with an authentication microservice on behalf of the application programs 1511, for example.

Local message handler 1515 can communicate with message handler 1542 of host computing device 1540 to transmit and receive data, as described herein.

Local message handler can relay data to and from application programs 1511 or at least one local system service 1512. Local system services 1512 may be, for example, a weather service, calendar service, navigation service, maps service, configuration service, or other service. At least some local system services 1512 may have counterpart microservices provided by a remote computing device 1580. For example, the system weather service may query a weather microservice provided by a remote computing device 1580 for weather updates. The query may be transmitted, and response received, via the host computing device, as described herein.

Other local system services may include, but are not limited to: a navigation service that interacts with a mapping microservice to determine navigation routes and retrieve maps for the user, and a location service that interacts with a location microservice to determine an estimated location of the wearable computing device, and to update the location microservice with the estimated location. In some cases, the location service can query the host computing device for its estimated location.

Local system services 1512 may communicate directly with application programs or user interface 1511. For example, a user messaging service may interact with a messaging application. However, in at least some implementations, local system services 1512 may be coordinated by a master service 1513, which may implement the data routing service as described herein. Master service 1513 may act as the interface between the local services and the local message handler. Master service 1513 can therefore consolidate data output from, or input to, each local system service. In at least some implementations, master service

1513 is the counterpart local service to the gateway service of remote computing device 1580*b*.

As described herein, host computing device 1540 can provide a host personal area network service that data communicatively couples the wearable computing device and the host computing device via a personal area network. The wearable computing device 1510 has a corresponding personal area network service that data communicatively couples the wearable computing device and the host computing device via the personal area network.

Host computing device 1540 can also provide a host network service that data communicatively couples the host computing device and the remote computing devices 1580*a* to 1580*d* via the data communication network 1560.

Host computing device 1540 can further provide a host routing service (e.g., message handler 1542 and socket module 1544) that routes communications between the at least one remote computing device and the master service of the wearable computing device via the personal area network and the gateway service of the remote computing device 1580*b*.

In at least some implementations or embodiments, a telemetry system service may be provided at the wearable computing device that interacts with a telemetry analytics microservice at a remote computing device that receives the telemetry data.

Figure 16:
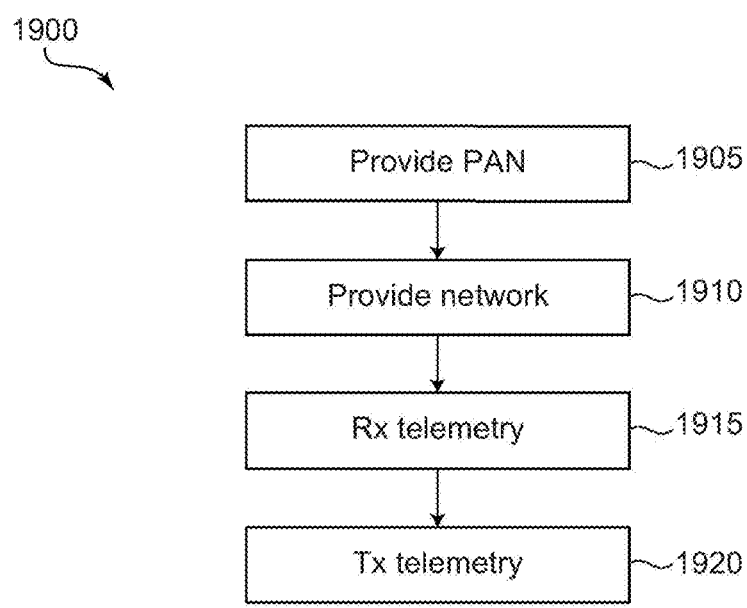
FIG. 16 is a process flow diagram for a method of data logging from a wearable computing device to at least one remote computing device.

Referring now to FIG. 16, there is illustrated a process flow diagram for a method of data logging from a wearable computing device to at least one remote computing device via a host computing device, in accordance with some implementations or embodiments.

Method 1900 begins at 1905 with the host computing device providing a personal area network service that data communicatively couples the wearable computing device to the host computing device. At 1910, the host computing device provides a network service that data communicatively couples the host computing device to the at least one remote computing device providing the telemetry analytics microservice.

At 1915, the host computing device receives telemetry data from the wearable computing device, and at 1920 the host computing device transmits the telemetry data to the at least one remote computing device computing device via the network service. In at least some implementations with a plurality of remote computing devices, the telemetry data is provided via a gateway service, as in the gateway service of remote computing device 1580*b*.

Telemetry data may be one or more log entry in relation to the wearable computing device, for example error log data generated by an application program or system service. In cases where the telemetry data is large, consisting of multiple log entries, the telemetry service can aggregate the plurality of log entries for communication to the host computing device at a future time. For example, the aggregated log entries can be sent at preset intervals, at a predefined time (e.g., defined by the user) or in response to a periodic or unique request from the telemetry analytics service at the remote computing device.

Figure 14:
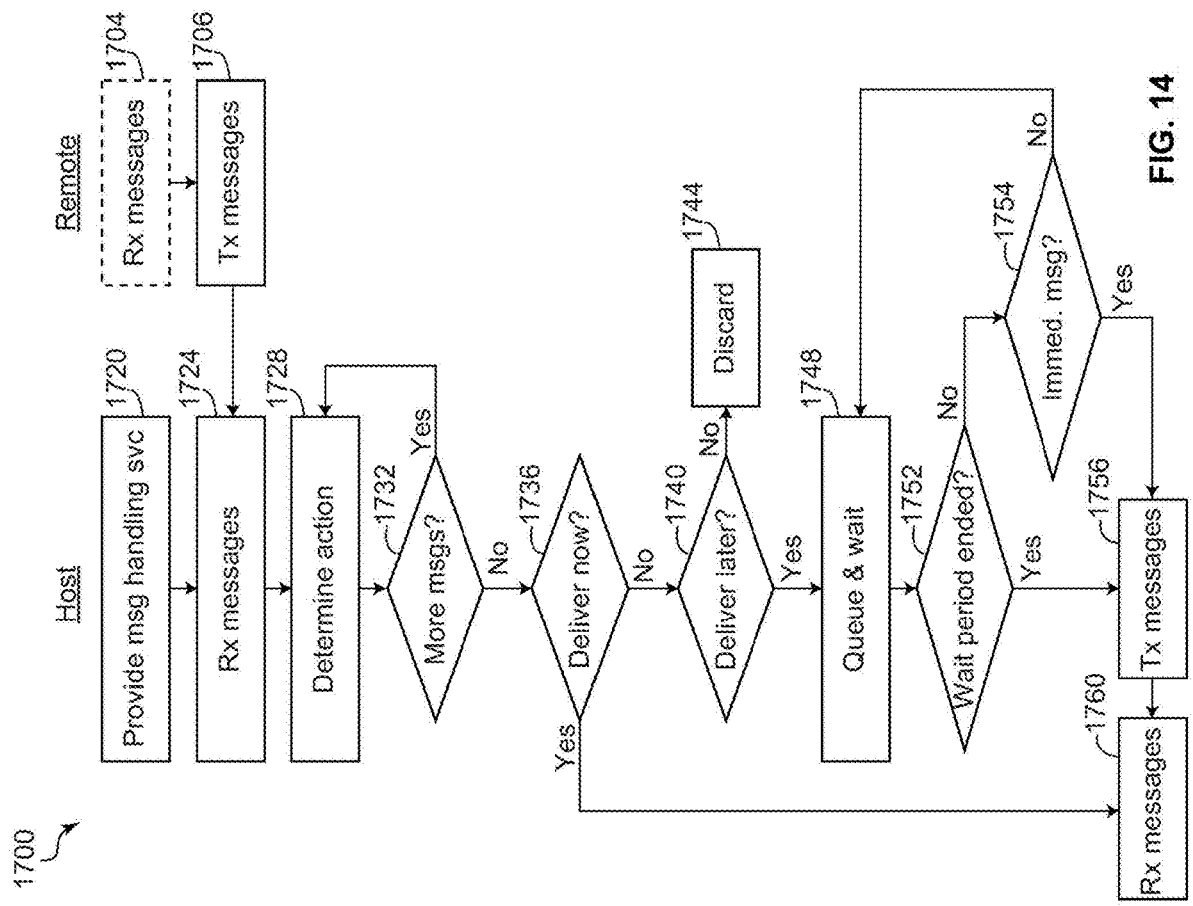
FIG. 14 is a process flow diagram for an example method of managing communications between a wearable computing device and at least one remote computing device.

Referring now to FIG. 14, there is illustrated a process flow diagram for an example method of managing communications between a wearable computing device and at least one remote computing device, using a host computing device.

Method 1700 may begin at 1720, with the host computing device providing a message handling service, such as message handler 1542 of FIG. 12A.

In any event, at 1704, with the remote computing device generating, or receiving from other microservices, one or more messages for delivery to the wearable computing device, and transmitting the one or more messages at 1706, e.g., via a gateway service.

At 1724, the message handling service of the host computing device receives the messages and, at 1728 and 1732, determines an action associated with each respective message. The action may be determined based on the content of each respective message, or may be based on a specific directive contained within the respective message.

For example, the message handling service may parse the one or more messages to determine a content type, such as text data or binary data. If the content type is text data, the message handling service may further process the text data, for example to generate a textual or iconographic summary of the text data. If the content type is binary data, the message handling service may process the content for uploading to the wearable computing device.

The message handling service then continues to take the respective action for each of the one or more messages.

At 1736, the message handling service determines if the respective message is intended for immediate delivery at 1754, in which case it may proceed immediately to 1756 and transmit the immediate delivery message. In some cases, delivery of such an immediate delivery message may prompt the message handling service to deliver previously-queued messages ahead of their scheduled delivery time.

If the respective message is not intended for immediate delivery, the message handling service may determine if the message is intended for later, or deferred, delivery. If so, the message may be put into a message delivery queue and wait for a delay period at 1748, otherwise the message may be discarded at 1744.

At 1752, the message handling service may determine whether the delay period has ended and, upon completion of the delay period, proceed to 1756 and complete delivery of the messages in the message delivery queue.

At 1760, the wearable computing device receives the messages.

In at least some implementations, the host computing device may provide a notification handling service, such as notification handler 1552 of FIG. 12A. In such cases, the message received at 1724 may be a push notification from a notification microservice. The notification handling service may receive the push notification via the message handling service and request additional messages from one or more microservice, which may be delivered using method 1700.

Figure 15:
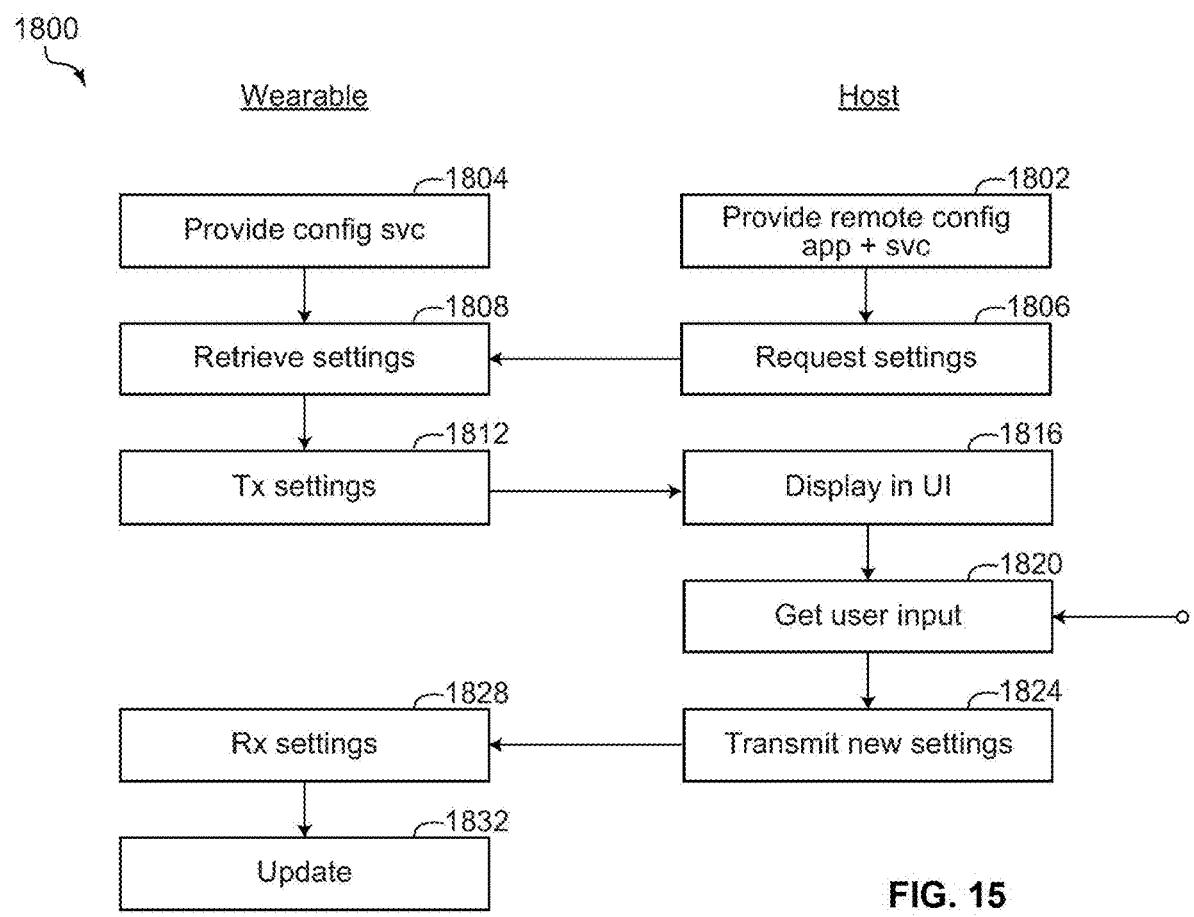
FIG. 15 is an example process flow for a method of configuring a wearable computing device.

Referring now to FIG. 15, there is illustrated an example process flow for a method of configuring a wearable computing device from a host computing device. The process flow may be carried out by a wearable computing device with a personal area network interface as described herein, and a host computing device with a host personal area network interface as described herein.

Method 1800 begins at 1802 with the host computing device providing a remote configuration application and a remote configuration service, which operate as described further below. In some cases, the functionality of the remote configuration application and remote configuration service may be combined.

The wearable computing device can provide a configuration service at 1804, which operates as described further below.

At 1806, the remote configuration application of the host computing device, through the remote configuration service, requests current configuration settings from the configuration service of the wearable computing device. The request is received at 1808 and the respective settings are received, then transmitted back to the remote configuration service at 1812.

At 1816, the retrieved configuration settings are provided to the remote configuration application, by the remote configuration service, for display in a user interface of the host computing device.

At 1820, user input is received from a host input device to determine one or more updated configuration settings and, based on the received user input data, the remote configuration application determines the one or more configuration settings of the wearable computing device to be updated. The updated configuration settings are provided to the remote configuration service, which transmits the updated settings at 1824.

The updated settings are received by the wearable computing device at 1828, and may be updated in a memory of the wearable computing device at 1832.

In some cases, the wearable computing device may provide a master service as described herein that consolidates data from the configuration service and at least one system service, in which case the one or more configuration settings are transmitted to the configuration service—and received from the host computing device—via the master service. In some cases, the wearable computing device may also provide a message handler as described herein that consolidates data from the configuration service and at least one application program of the wearable computing device, in which case the one or more configuration settings are transmitted to the configuration service—and received from the host computing device—via the message handler.

As noted herein, in at least some embodiments, the wearable computing device may be a head-mounted device. In particular, the head-mounted device may have a display that is mounted in the user's line of sight. For example, the head-mounted device may be in the form factor of eyeglasses and the display may be a retinal projection device (e.g., a low-power laser), a light emitting diode array that reflects off a lens in front of the user's eye, etc. Such display devices may provide a transparent "background". That is, areas of the display extent are not actively rendered in every refresh interval, and therefore are effectively transparent, allowing the user to see background in areas of the display that are not actively rendered. However, in such cases, the user interface provided on the display may, from time to time, obscure physical objects in the user's line of sight.

In at least some embodiments, the user interface may provide an environmental interaction mode, in which aspects of the user interface may be disabled, repositioned, or de-emphasized in order to permit the user to clearly see the physical environment and/or to be able to interact with an object or person in the physical environment that would otherwise be occluded or partially occluded by the display. The described embodiments may also provide for the environmental interaction mode to be disabled, thereby allowing the user to seamlessly re-engage in a previous user interface interaction (e.g., without having to re-launch an application program).

For example, a front-facing image sensor (e.g., camera) may be provided on the wearable computing device to capture images of the user's environment, and to enable a processor to detect objects in the environment, e.g., via object recognition. The processor activate the environmental interaction mode automatically in response to certain conditions in the captured images, or other sensor data such as audio. For example, the processor may activate the environmental interaction mode in response to inferring that the user is gazing at specific objects in the environment. Similarly, the processor may activate the environmental interaction mode in response to detecting speech, inferring that the user is engaging in a conversation. In some cases, audio and visual sensory information may be combined to determine whether to activate the environmental interaction mode.

In some cases, the processor may detect that the user is attempting to grasp an object with a hand or other tool, and activate the environmental interaction mode to allow the user to see an object that would otherwise be occluded by the display.

In some cases, the user may activate the environmental interaction mode manually, or may prompt the user to activate the environmental interaction mode in response to detecting objects or other stimuli.

The processor may nevertheless retain the user interface elements in memory, to permit rapid restoration of the user interface to its original state when the environmental interaction mode is disabled.

Figure 17:
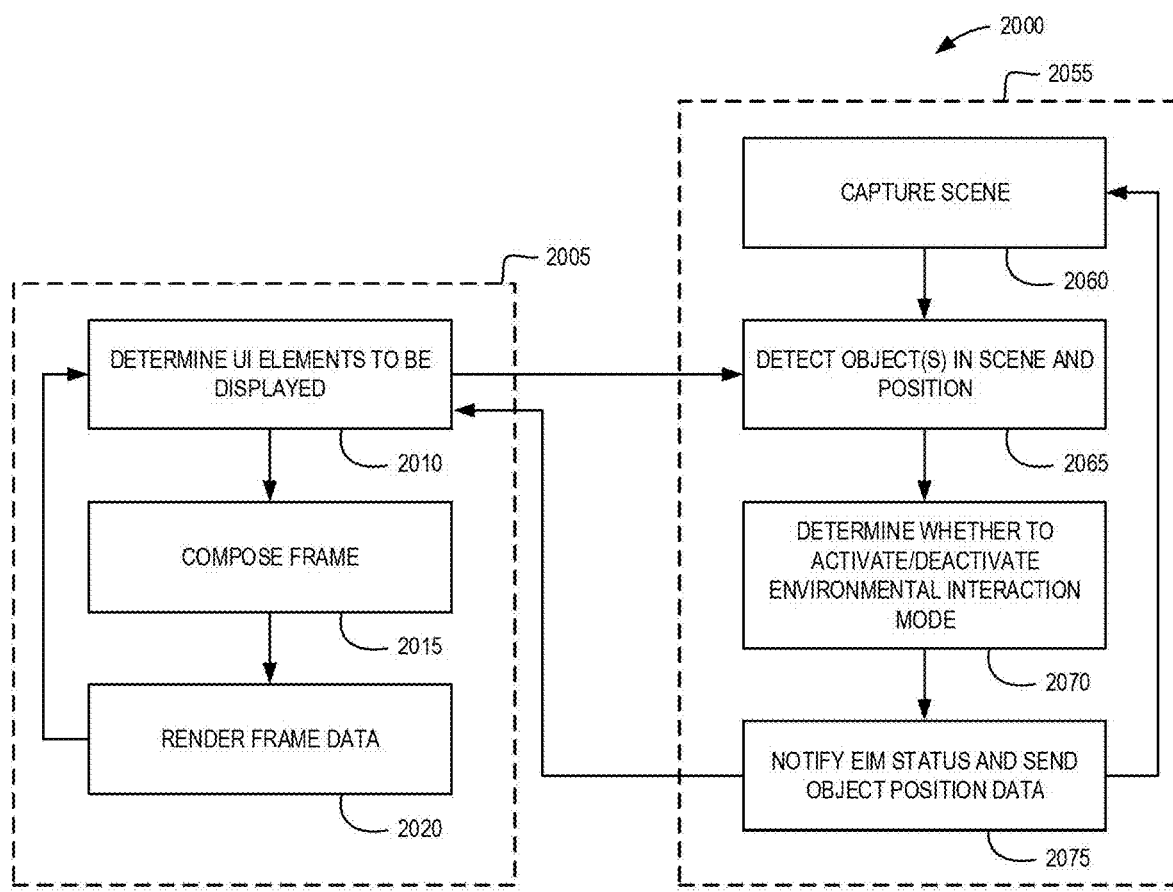
FIG. 17 is a process flow for a method of displaying a visual interface in a display of a wearable computing device in accordance with some embodiments.

Referring now to FIG. 17, there is illustrated an example process flow for a method of displaying a visual interface in a display of a wearable computing device, the display generally oriented in a first direction facing the user while the wearable computing device is in use. The process flow 2000 may be carried out by a wearable computing device as described herein.

Method 2000 may begin at 2010 with a processor of the wearable computing device determining that one or more user interface elements is to be displayed at 2010. In some cases, the processor may also determine whether the entire user interface is to be displayed and, if so, what the properties of the display should be. For example, in some cases, the display may be dimmed or de-emphasized.

At 2015, the processor may compose the user interface elements for the display. Composition may include determining one or more properties, such as position in the available display area, size of the user interface element, color, opacity, animation, etc. Frame composition data may be provided to the environmental detection loop 2055, which may use it as further described herein.

At 2020, the processor may render the frame data into a frame buffer, based on the composition, or may offload rendering to a suitable graphics processor in some cases, and return to 2010. Acts 2010, 2015 and 2020 may be referred to as a user interface rendering loop 2005.

Rendered frame data may be displayed from the frame buffer once it is available. Display of the frame data generally can occur asynchronously to the rendering, based on a display-specific refresh rate, and depending on the specific display device that is used.

Asynchronously to both the display and to the user interface rendering loop, an environmental detection loop 2055 may be carried out by the processor.

Environmental detection loop 2055 may begin at 2060 with an image detection device of the wearable computing device capturing at least one image (e.g., a series of images, or video) at 2060. The image detection device may be oriented outwardly from the user's face, generally to coincide with a direction of the user's vision. That is, if the display of the wearable computing device is oriented in a first direction, toward the user's eyes, then the image detection device can be oriented in a second direction, opposite the first direction, outwardly from the user's face.

In some embodiments, the image detection device can be a colour and/or high resolution (e.g., 720p resolution or better) camera device. In some other embodiments, the image detection device can be a low resolution and/or monochrome camera, suitable for computationally detecting objects but not for display. That is, the at least one image captured by the image detection device generally is not displayed to the user in the wearable computing device display. To minimize power draw that may otherwise occur if the image detection device were to continuously sample a scene, the capture of images may be triggered by one or more additional signals. For example, signals may be audio signals (e.g., conversation detection), altimeter signals (e.g., suggestive of ascending/descending stairs). In such cases, image detection may be used to confirm the additional signals.

However, in some embodiments, the image detection device or another image detection device may be directed toward the user's face to perform gaze detection based on the user's eye movements. Monocular or binocular data may be used. In the case of binocular data, eye convergence detection may be used to determine a target of the user's vision (e.g., whether near field for the display or far field for the detected object). Gaze data may be combined with other data to determine the user's line of sight as described further.

At 2065, the processor may detect, in the at least one image, one or more objects and their positions within the field of view of the image detection device. For example, the processor may perform object recognition processing using, e.g., machine learning, deep learning or other suitable techniques. Object recognition processing may be, for example, Objects may include, for example, a human face, a body part, an animal, a cup or glass, a staircase, a door handle, road signs, etc. The relative size and position of the objects may also be determined, along with other characteristics (e.g., predominant color, etc.). A bounding box or polygon may be determined to characterize outlines of the detected object. In some embodiments, a motion of the object may also be determined and a speed or acceleration can be computed.

In at least some embodiments, the object detection may be offloaded to a host computing device or a remote computing device as described herein. In such embodiments, the act of detecting objects may be replaced with an act of transmitting the at least one image—which may be temporarily stored at the wearable computing device—to the host computing device and/or remote computing device (possibly via the host computing device), and receiving object detection data from the respective device. Transmission and reception can occur via wireless data connection (e.g., Bluetooth™, Wi-Fi™, cellular or other data connection, as described herein).

Based on the object detection, the processor may determine whether an environmental interaction mode is to be activated at 2070. For example, detection may involve determining or detecting that one or more detected objects are within a line of sight of the user, and that one or more user interface element (as positioned in the display area by the user interface rendering loop) may occlude or partially occlude one or more of the detected objects. In some cases, the determination whether to activate the environmental interaction mode (or to remain in the mode) following object detection may be made based on a state machine that evaluates an internal decision tree to determine its next state.

Optionally, in some embodiments, eye tracking may be used to detect the user's gaze direction. That is, when the user gazes at a detected object (e.g., for a predetermined elapsed period of time), the environmental interaction mode may be activated. In such embodiments, the environmental interaction mode may be activated in response to the user's gaze, such that detected objects not within the user's gaze will not necessarily cause activation of the environmental interaction mode.

In some cases, eye tracking may include determining a focal length of the eye of the user, and determining that a focus distance of the eye of the user is longer than a focal length of the display from the eye of the user. When the user's eye is not focused on the detected object, the environmental interaction mode need not be engaged.

Alternatively, at 2070, if the environmental interaction mode is already activated, the processor may determine whether it is to be deactivated. Deactivation may be appropriate, for example, when the conditions that triggered the activation of the environmental interaction mode are no longer present (e.g., the detected object is no longer present), after an elapsed time period, in response to a signal (e.g., manual deactivation signal, audio signal, etc.), or some combination of these.

At 2075, the environmental interaction mode is activated by the processor (or deactivated, if it was active) and a notification of the environmental interaction mode status is transmitted to the user interface rendering loop, along with object position data, and other object characteristics, corresponding to the detected objects. The processor can return to 2260 to capture additional images. Asynchronously, the processor executing the user interface rendering loop can thereupon use the object position data and other object characteristics to adjust the user interface accordingly when composing the frame (e.g., to move user interface elements in the display so as not to occlude the object or objects).

For example, activating the environmental interaction mode may involve: reducing a brightness of a user interface element (whether or not it overlaps with a detected object), reducing the brightness of the entire display, decreasing an opacity of a user interface element (whether or not it overlaps with a detected object) or of the entire display, temporarily removing a user interface element, repositioning the user interface element in the display (whether or not it overlaps with a detected object), temporarily deactivating the entire display, or any combination of the above.

Conversely, deactivating the environmental interaction mode may involve increasing a brightness of a user interface element, increasing the brightness of the entire display, increasing an opacity of a user interface element or of the entire display, temporarily removing a user interface element, repositioning the user interface element in the display (e.g., to a periphery of the display area), reactivating the entire display, or any combination of the above.

Figure 18A:
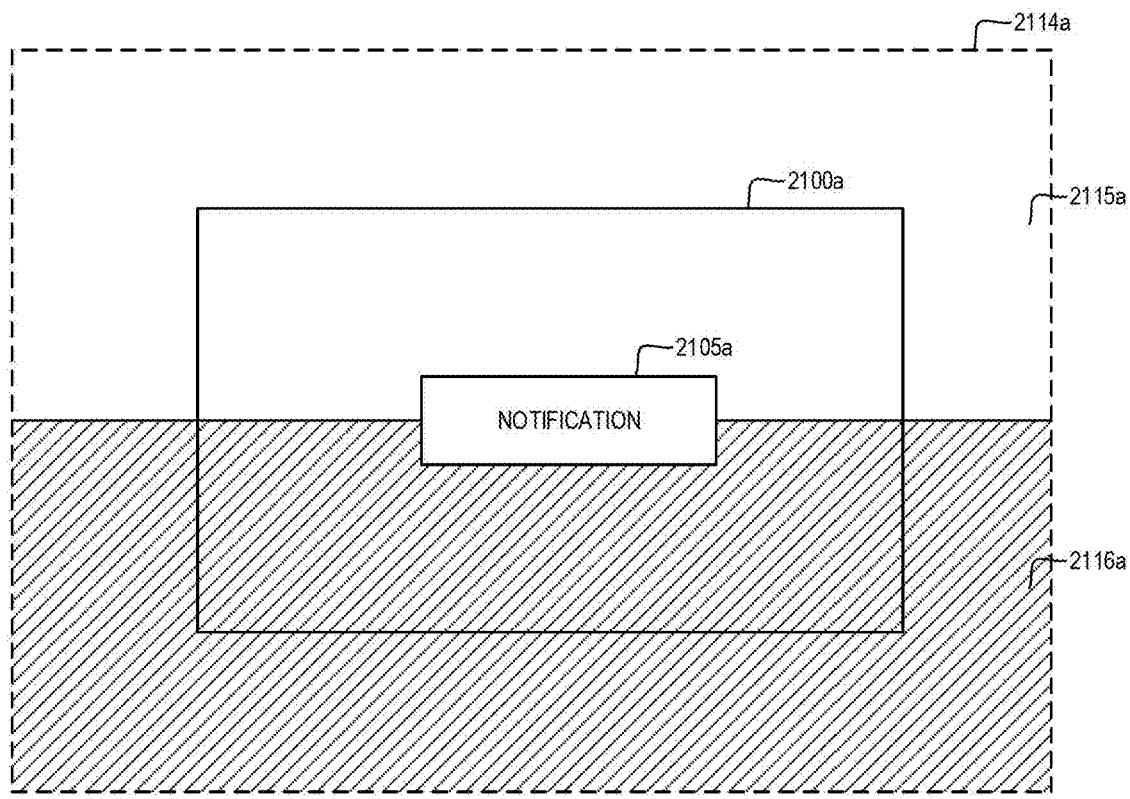
FIGS. 18A-18F are illustrations of the visual interface of FIG. 17 while in use.
Figure 18B:
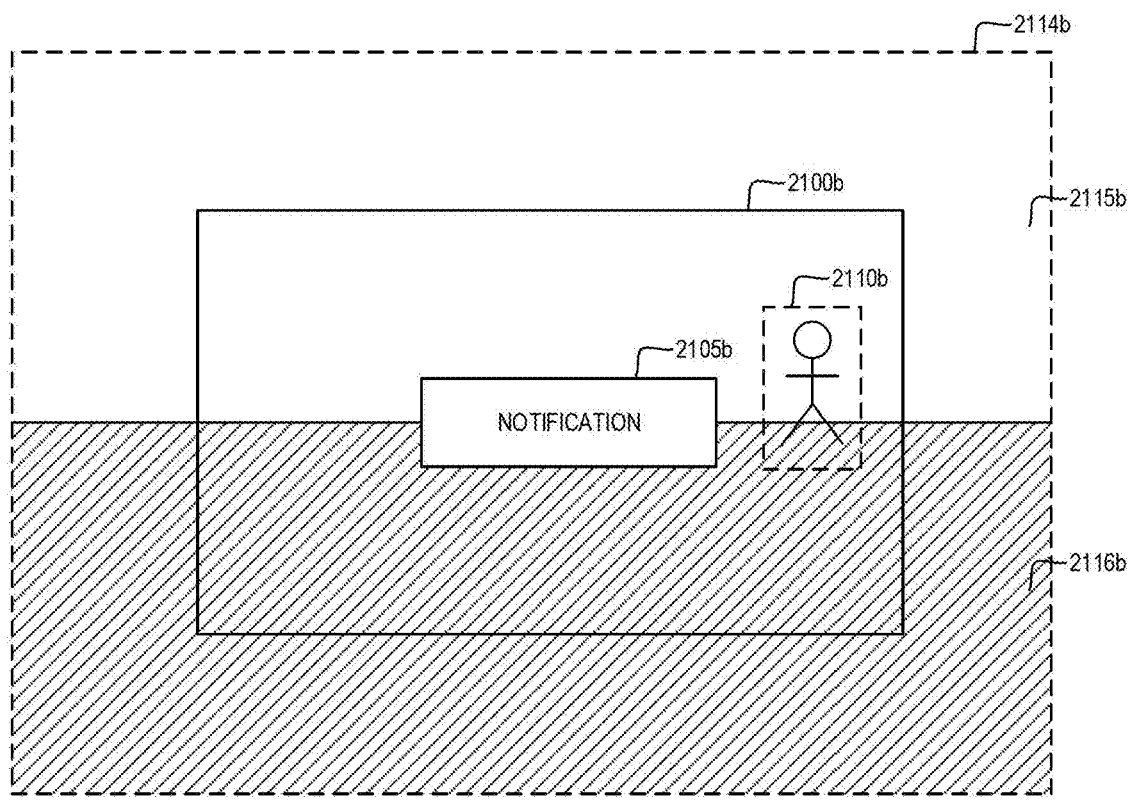
Figure 18C:
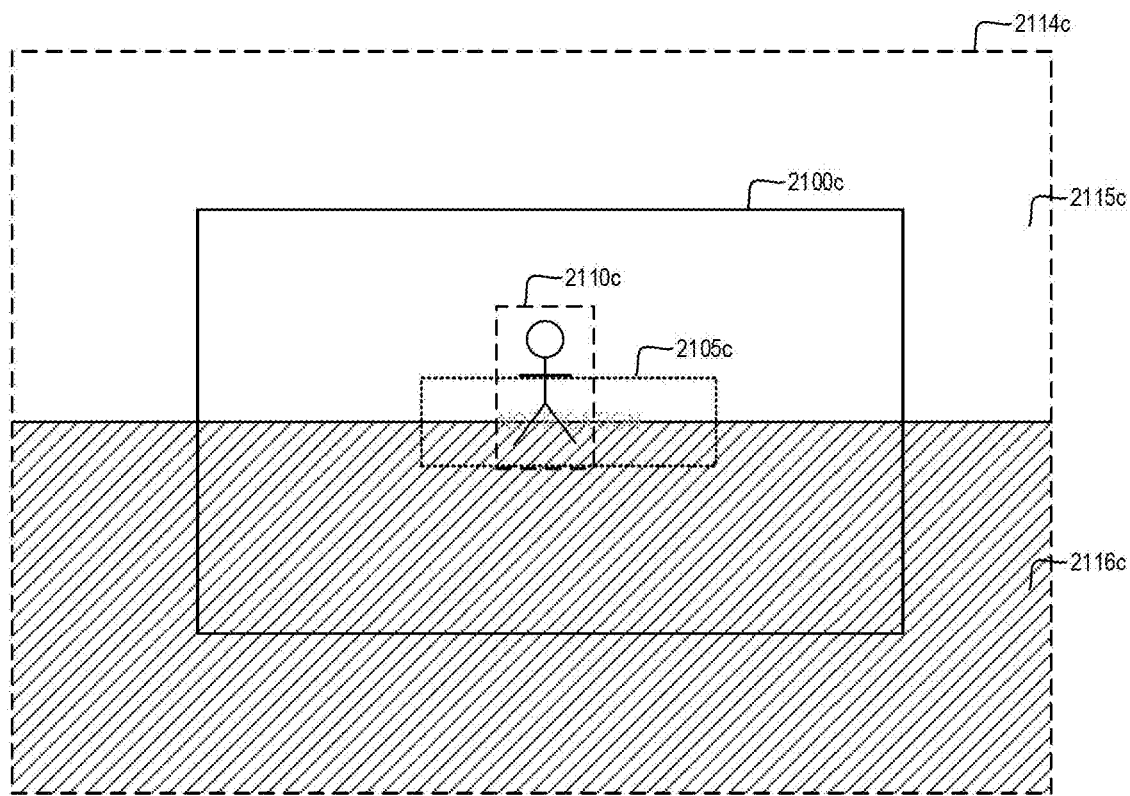
Figure 18D:
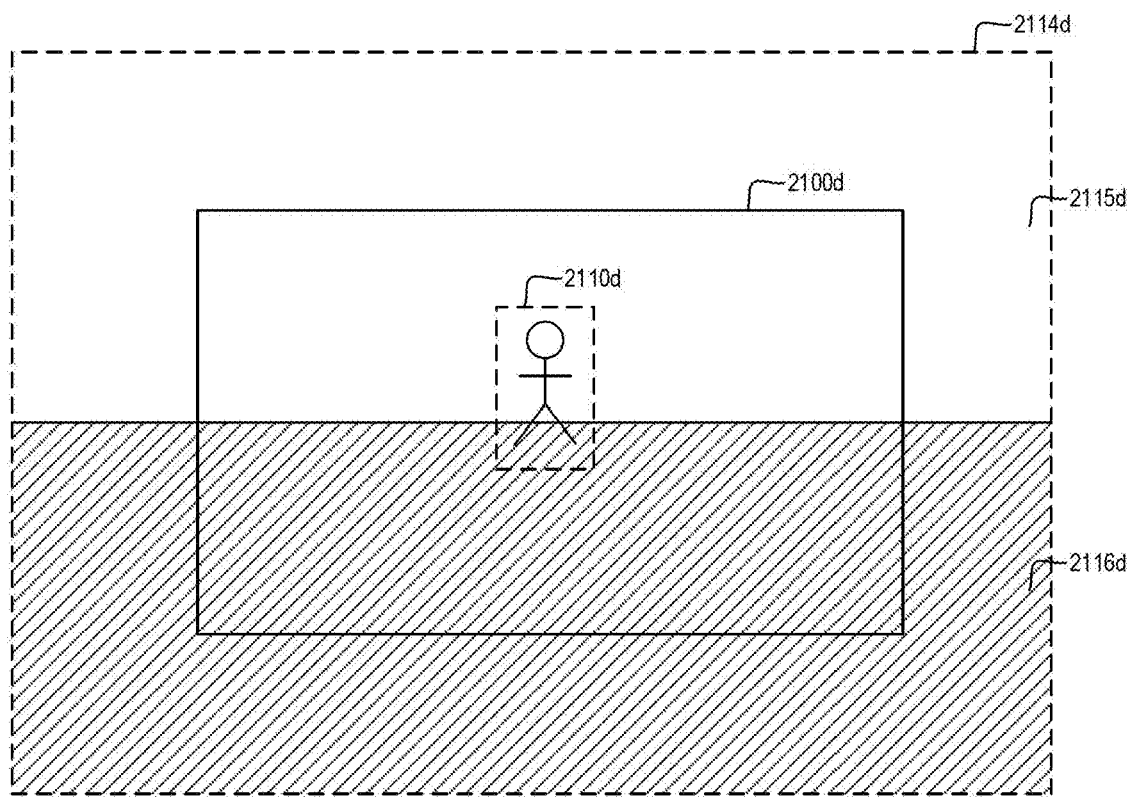
Figure 18E:
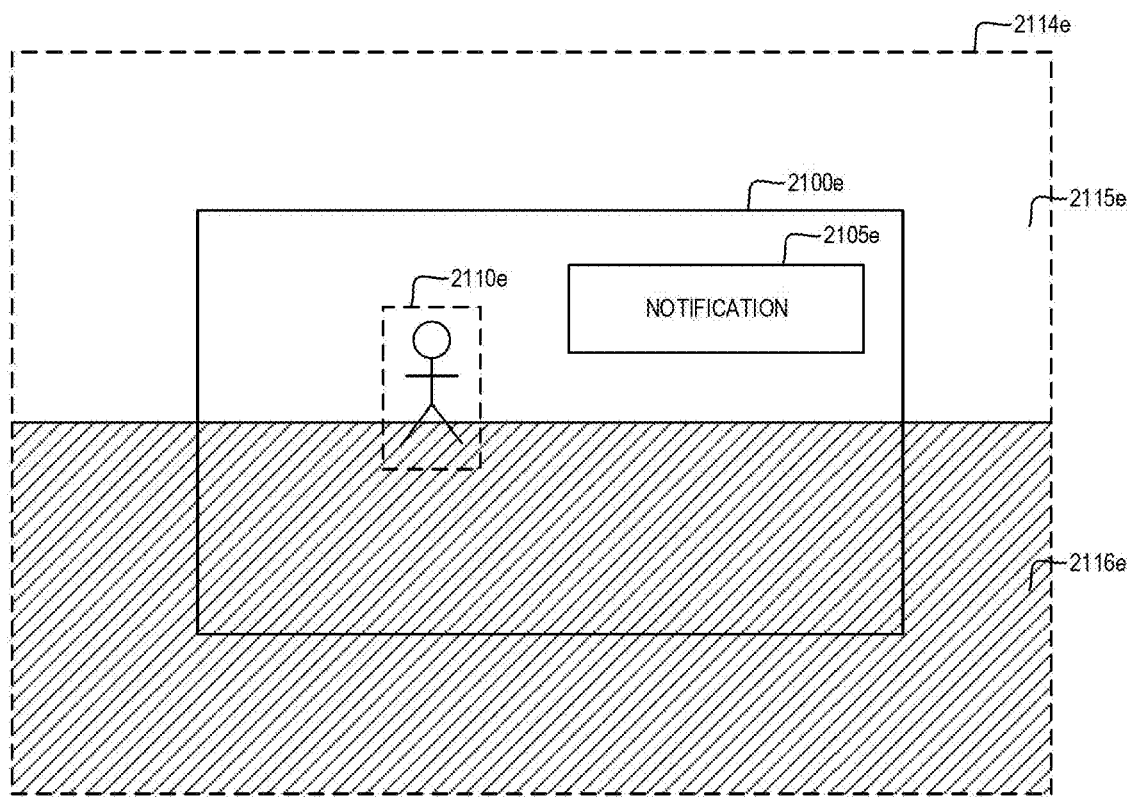
Figure 18F:
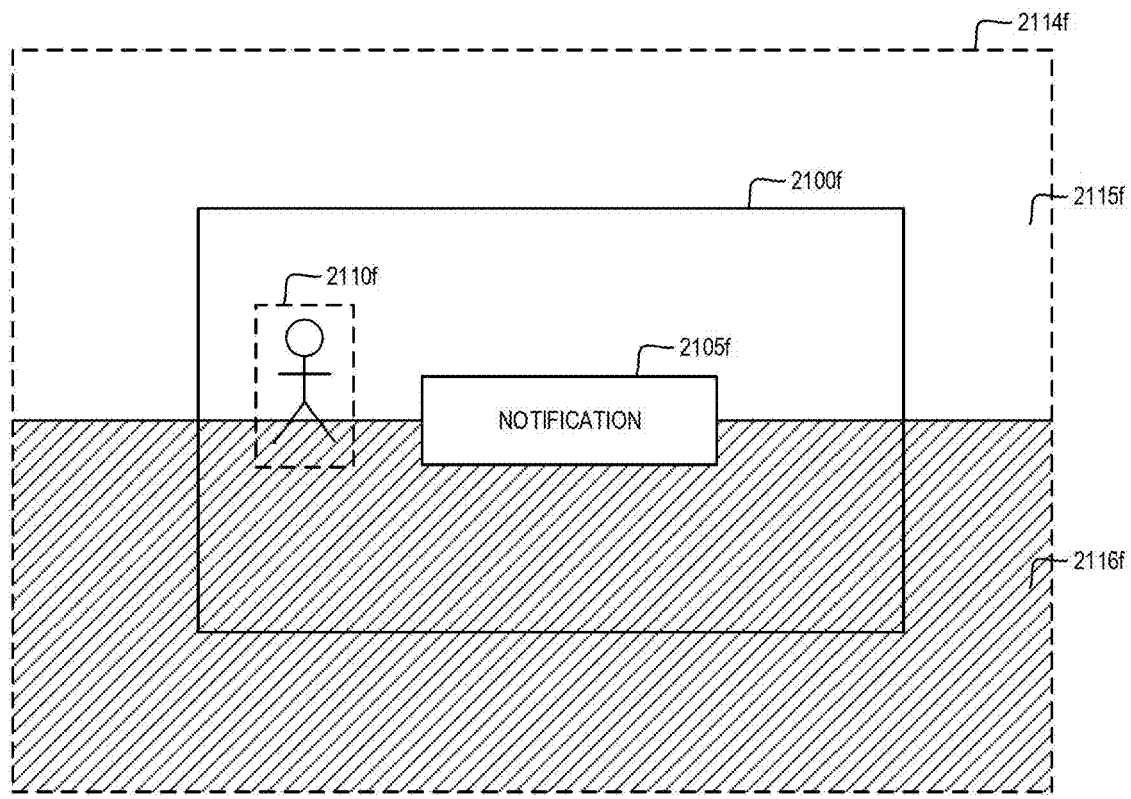
Figure 19:
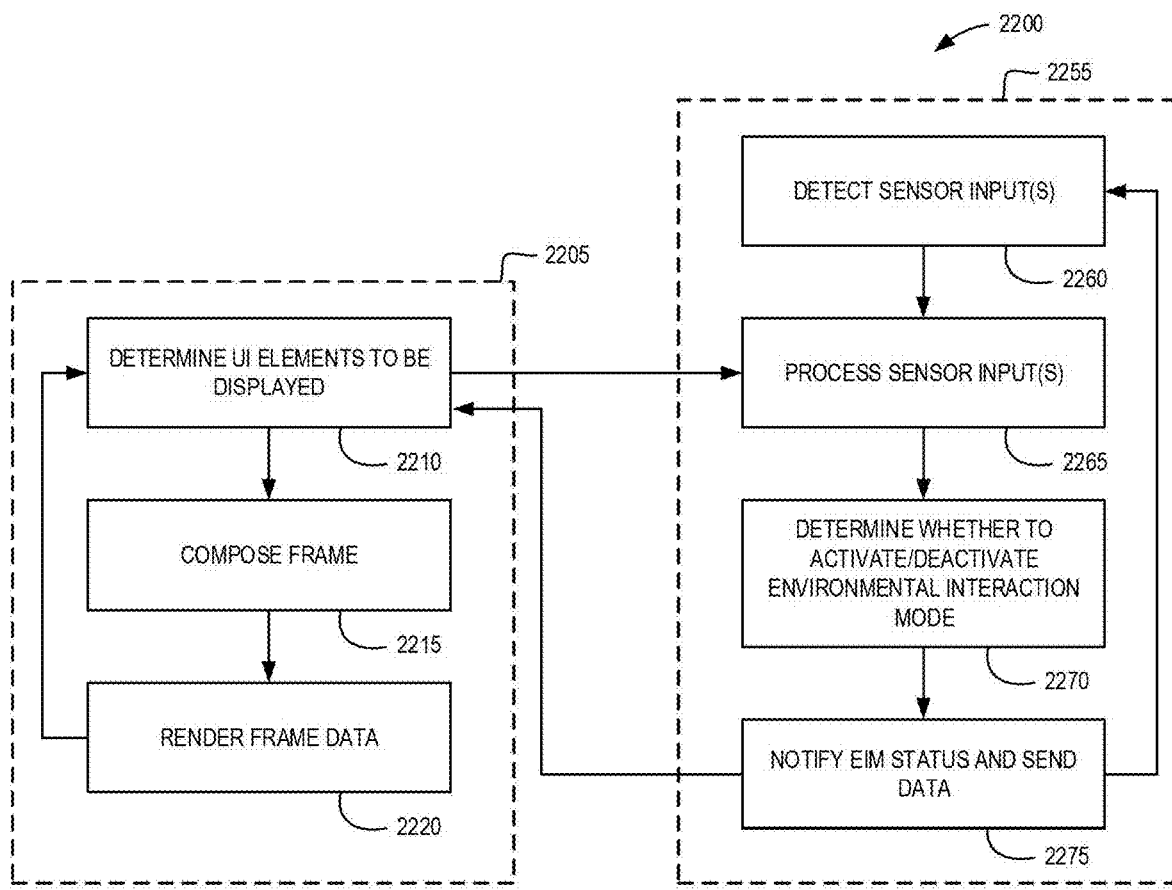
FIG. 19 is another process flow for a method of displaying a visual interface in a display of a wearable computing device in accordance with some embodiments.

Referring now to FIGS. 18A to 18F, there are illustrated example scenarios that may occur when using the method of FIG. 17 or FIG. 19.

FIG. 18A illustrates an example scene 2114*a* that may be viewed by a user. The scene includes a ground region 2116*a* and a sky region 2115*a*. A display is provide in the user's line of sight, which has a display area 2100*a*. Within the display area is a user interface element 2105*a*. It can be seen that display has a transparent background. That is, the user interface element 2015*a* occludes both the ground region 2116*a* and the sky region 2115*a* within the display area 2100*a*.

FIG. 18B illustrates another example scene 2114*b*, which is similar to example scene 2114*a*. The elements of FIG. 18B correspond to their respective like-numbered equivalents of FIG. 18A. For example, ground region 2116*b* corresponds to ground region 2116*a*.

FIG. 18B further illustrates a detected object 2110*b*, shown in this case with a bounding box. Detected object

2110b is within the display area 2100b, but is not occluded by user interface element 2105b. Accordingly, in some embodiments, the environmental interaction mode need not be activated.

FIG. 18C illustrates another example scene 2114c, which is similar to example scene 2114b. The elements of FIG. 18C correspond to their respective like-numbered equivalents of FIG. 18B. For example, ground region 2116c corresponds to ground region 2116b and detected object 2110c corresponds to detected object 2110b.

In contrast to the scene of FIG. 18B, the scene of FIG. 18C has the detected object 2110c at least partially occluded by user interface element 2105c. Accordingly, in some embodiments, the environmental interaction mode may be activated, and the user interface element 2105c is dimmed, or decreased in opacity, to enable a user of the wearable computing device to see the detected object 2110c.

FIG. 18D illustrates another example scene 2114d, which is similar to example scene 2114b. The elements of FIG. 18D correspond to their respective like-numbered equivalents of FIG. 18B. For example, ground region 2116d corresponds to ground region 2116b and detected object 2110d corresponds to detected object 2110b.

In contrast to the scene of FIG. 18B, the scene of FIG. 18D has the detected object 2110d at least partially within the area that would otherwise be occupied by a user interface element such as user interface element 2105b (not shown in FIG. 18D). Accordingly, in some embodiments, the environmental interaction mode may be activated, and the user interface element may be temporarily removed from the display area, to enable a user of the wearable computing device to see the detected object 2110d.

FIG. 18E illustrates another example scene 2114e, which is similar to example scene 2114b. The elements of FIG. 18E correspond to their respective like-numbered equivalents of FIG. 18B. For example, ground region 2116e corresponds to ground region 2116b and detected object 2110e corresponds to detected object 2110b.

In contrast to the scene of FIG. 18B, the scene of FIG. 18E has the detected object 2110e at least partially within the area that would otherwise be occupied by user interface element 2105e. Accordingly, in some embodiments, the environmental interaction mode may be activated, and the user interface element 2105e may be temporarily or permanently repositioned in the display area 2100e, to enable a user of the wearable computing device to see the detected object 2110e.

FIG. 18F illustrates another example scene 2114f, which is similar to example scene 2114e. The elements of FIG. 18F correspond to their respective like-numbered equivalents of FIG. 18E. For example, ground region 2116f corresponds to ground region 2116e.

In the example of FIG. 18F, the detected object 2110f is not occluded by the user interface element 2105f. For example, the detected object 2110f may have moved out of occlusion by the user interface element 2105f. Accordingly, in some embodiments, the environmental interaction mode may be deactivated, causing the user interface element 2105f to be restored to its original state.

Referring now to FIG. 19, there is illustrated another example process flow for a method of displaying a visual interface in a display of a wearable computing device, the display generally oriented in a first direction facing the user while the wearable computing device is in use. The process flow 2200 may be carried out by a wearable computing device as described herein. The elements of FIG. 19 generally correspond to their respective like-numbered equivalents of FIG. 17, unless otherwise indicated.

Method 2200 may begin at 2210 with a processor of the wearable computing device determining that one or more user interface elements is to be displayed at 2210. In some cases, the processor may also determine whether the entire user interface is to be displayed and, if so, what the properties of the display should be. For example, in some cases, the display may be dimmed or de-emphasized.

At 2215, the processor may compose the user interface elements for the display. Composition may include determining one or more properties, such as position in the available display area, size of the user interface element, color, opacity, animation, etc. Frame composition data may be provided to the environmental detection loop 2255, which may use it as further described herein.

At 2220, the processor may render the frame data into a frame buffer, based on the composition, or may offload rendering to a suitable graphics processor in some cases, and return to 2210. Acts 2210, 2215 and 2220 may be referred to as a user interface rendering loop 2205.

Rendered frame data may be displayed from the frame buffer once it is available. Display of the frame data generally can occur asynchronously to the rendering, based on a display-specific refresh rate, and depending on the specific display device that is used.

Asynchronously to both the display and to the user interface rendering loop, an environmental detection loop 2255 may be carried out by the processor.

Environmental detection loop 2255 may begin at 2260 with at least one sensor of the wearable computing device detecting at least one sensor input. The at least one sensor may be an audio sensor (e.g., to detect speech, or verbal commands), an inertial motion sensor (e.g., to detect head movement), an altimeter (e.g., to detect ascending or descending a staircase by the user), a radio signal sensor (e.g., to detect proximity or movement of a controller device, such as controller device 120), a data signal sensor, an image detection device (as described with reference to FIG. 17), or any combination thereof.

At 2065, the processor may process the at least one sensor input to detect a stimulus or stimuli. In at least some embodiments, the stimulus detection may be offloaded to a host computing device or a remote computing device as described herein. In such embodiments, the act of detecting stimuli may be replaced with an act of transmitting the at least one sensor input—which may be temporarily stored at the wearable computing device—to the host computing device and/or remote computing device (possibly via the host computing device), and receiving stimulus detection data from the respective device. Transmission and reception can occur via wireless data connection (e.g., Bluetooth™, Wi-Fi™, cellular or other data connection, as described herein).

Based on the stimulus detection, the processor may determine whether an environmental interaction mode is to be activated at 2070.

Alternatively, at 2070, if the environmental interaction mode is already activated, the processor may determine whether it is to be deactivated. Deactivation may be appropriate, for example, when the conditions that triggered the activation of the environmental interaction mode are no longer present.

At 2075, the environmental interaction mode is activated by the processor (or deactivated, if it was active) and a notification of the environmental interaction mode status is transmitted to the user interface rendering loop, along with auxiliary data relating to the stimuli. The processor executing the user interface rendering loop can thereupon use the auxiliary data to adjust the user interface accordingly when composing the frame.

For example, activating the environmental interaction mode may involve: reducing a brightness of a user interface element, reducing the brightness of the entire display, decreasing an opacity of a user interface element or of the entire display, temporarily removing a user interface element, repositioning the user interface element in the display, temporarily deactivating the entire display, or any combination of the above.

Conversely, deactivating the environmental interaction mode may involve increasing a brightness of a user interface element, increasing the brightness of the entire display, increasing an opacity of a user interface element or of the entire display, temporarily removing a user interface element, repositioning the user interface element in the display (e.g., to a periphery of the display area), reactivating the entire display, or any combination of the above.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to U.S. Provisional Patent Application No. 62/670,200, U.S. Provisional Patent Application No. 62/609,681, U.S. Provisional Patent Application No. 62/609,607, U.S. Patent Publication 2016/0238845, U.S. Patent Publication 2016/0377866 and U.S. Patent Publication 2016/0377865, are incorporated herein by reference, in their entirety. Aspects of the embodiments can be modified, if necessary, to employ systems, circuits and concepts of the various patents, applications and publications to provide yet further embodiments.

We claim:

1. A method of displaying a visual interface in a display of a wearable device, the display generally oriented in a first direction facing a user while the wearable device is in use, the method comprising:
    displaying a user interface element in the display;
    capturing at least one image using an image detection device of the wearable device, the image detection device generally oriented in at least a second direction opposite the first direction;
    detecting, in the at least one image, one or more objects within a line of sight of the user;
    determining that the displayed user interface element at least partially occludes the one or more objects within the line of sight of the user, wherein determining that the displayed user interface element at least partially occludes the one or more objects within the line of sight of the user comprises:
        determining a focal length of an eye of the user; and
        determining that a focus distance of the eye of the user is longer than a focal length of the display from the eye of the user; and
    modifying the displayed user interface element so as not to occlude the one or more objects within the line of sight of the user.

2. The method of claim 1, wherein modifying the displayed user interface element comprises reducing a brightness of the user interface element.

3. The method of claim 1, wherein modifying the displayed user interface element comprises reducing a display brightness.

4. The method of claim 1, wherein modifying the displayed user interface element comprises decreasing an opacity of the user interface element.

5. The method of claim 1, wherein modifying the displayed user interface element comprises decreasing a display opacity.

6. The method of claim 1, wherein modifying the displayed user interface element comprises temporarily removing the user interface element from the display.

7. The method of claim 1, wherein modifying the displayed user interface element comprises repositioning the user interface element in the display.

8. The method of claim 1, wherein modifying the displayed user interface element comprises disabling the display.

9. The method of claim 1, further comprising:
    capturing at least one additional image using the image detection device;
    detecting that the one or more objects are no longer present in the at least one additional image; and
    returning the user interface element to a previous state.

10. The method of claim 9, wherein returning the user interface element to the previous state comprises one or more of increasing a brightness of the user interface element, increasing a display brightness, increasing an opacity of the user interface element, increasing a display opacity, restoring the user interface element to the display, repositioning the user interface element in the display, and re-enabling the display.

11. The method of claim 1, wherein detecting the line of sight of the user comprises tracking an eye of the user using a gaze detection device generally oriented in the first direction.

12. The method of claim 1, wherein detecting the one or more objects within the line of sight of the user; comprises: a processor of the wearable device performing object recognition processing the at least one image.

13. The method of claim 1, wherein detecting the one or more objects within the line of sight of the user; comprises:
    transmitting the at least one image to a computing device; and
    receiving, from the computing device, an indication of the one or more objects within the image.

14. A method of displaying a visual interface in a display of a wearable device, the display generally oriented in a first direction facing a user while the wearable device is in use, the method comprising:
    displaying a user interface element in the display;
    detecting at least one sensor input from an inertial motion sensor;

processing the at least one sensor input to identify an inertial stimulus of the wearable device, wherein the inertial stimulus of the wearable device comprises an ascending or descending of the user; and in response to detecting the inertial stimulus of the wearable device, modifying the displayed user interface element such that the user interface element does not occlude at least a portion of a field of vision of the user.

15. The method of claim 14, wherein the inertial stimulus of the wearable device further comprises a head movement.

16. A wearable computing device comprising:

a memory;

a display device, the display generally oriented in a first direction facing a user while the wearable computing device is in use;

an image detection device, the image detection device generally oriented in at least a second direction opposite the first direction; and a processor operatively coupled to the memory, the display device, and the image detection device, the processor configured to:

display a user interface element in the display device;

capture at least one image using the image detection device;

detect, in the at least one image, one or more objects within a line of sight of the user;

determine that the displayed user interface element at least partially occludes the one or more objects within the line of sight of the user by:

determining a focal length of an eye of the user; and determining that a focus distance of the eye of the user is longer than a focal length of the display from the eye of the user; and modify the displayed user interface element so as not to occlude the one or more objects within the line of sight of the user.

* * * * *

UNITED STATES PATENT AND TRADEMARK OFFICE
CERTIFICATE OF CORRECTION

PATENT NO. : 11,580,324 B2  
APPLICATION NO. : 16/900099  
DATED : February 14, 2023  
INVENTOR(S) : Mathieu Boulanger et al.

Page 1 of 1

It is certified that error appears in the above-identified patent and that said Letters Patent is hereby corrected as shown below:

In the Claims

Column 42 Line 52, In Claim 12, please correct "user;" to be --user--

Column 42 Line 56, In Claim 15, please correct "user;" to be --user--

Signed and Sealed this  
Twenty-eighth Day of November, 2023

Katherine Kelly Vidal  
*Director of the United States Patent and Trademark Office*